US007283471B2

(12) United States Patent
Gutierrez et al.

(10) Patent No.: US 7,283,471 B2
(45) Date of Patent: Oct. 16, 2007

(54) SYSTEM AND METHOD FOR REGULATING MESSAGE FLOW IN A DIGITAL DATA NETWORK

(75) Inventors: Maria C. Gutierrez, Concord, MA (US); Shawn Adam Clayton, Boylston, MA (US); David R. Follett, Boxborough, MA (US); Harold E. Roman, Acton, MA (US); Nitin D. Godiwala, Boylston, MA (US); Richard F. Prohaska, Westford, MA (US); James B. Williams, Lowell, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 677 days.

(21) Appl. No.: 10/386,642

(22) Filed: Mar. 11, 2003

(65) Prior Publication Data

US 2003/0174647 A1 Sep. 18, 2003

Related U.S. Application Data

(63) Continuation of application No. 09/065,118, filed on Apr. 23, 1998, now Pat. No. 6,570,850.

(51) Int. Cl.
*H04L 1/00* (2006.01)

(52) U.S. Cl. ...................... 370/230; 370/235; 370/413; 370/419

(58) Field of Classification Search ................ None
See application file for complete search history.

(56) References Cited

U.S. PATENT DOCUMENTS 4,799,215 A * 1/1989 Suzuki ........................ 370/232
4,799,219 A 1/1989 Calvignac et al.

(Continued)

FOREIGN PATENT DOCUMENTS

EP 0 712 220 A1 5/1996
EP 0 782 302 A2 7/1997

OTHER PUBLICATIONS

Tsang et al, A Two-Level Flow Control Scheme for ABR Traffic in ATM Network, IEICE, pp. 1-8, Jan. 1996.*

(Continued)

*Primary Examiner*—Frank Duong
(74) *Attorney, Agent, or Firm*—Morrison & Foerster LLP

(57) ABSTRACT

A system includes a plurality of computers interconnected by a network including one or more switching nodes. The computers transfer messages over virtual circuits established thereamong. A computer, as a source computer for one or more virtual circuit(s), schedules transmission of messages on a round-robin basis as among the virtual circuits for which it is source computer. Each switching node which forms part of a path for respective virtual circuits also forwards messages for virtual circuits in a round-robin manner, and, a computer, as a destination computer for one or more virtual circuit(s), schedules processing of received messages in a round-robin manner. Round-robin transmission, forwarding and processing at the destination provides a degree of fairness in message transmission as among the virtual circuits established over the network. In addition, messages are transmitted in one or more cells, with the round-robin transmission being on a cell basis, so as to reduce delays which may occur for short messages if a long messages were transmitted in full for one virtual circuit before beginning transmission of a short message for another virtual circuit. For each virtual circuit, the destination computer and each switching node along the path for the virtual circuit can generate a virtual circuit flow control message for transmission to the source computer to temporarily limit transmission over the virtual circuit if the amount of resources being taken up by messages for the virtual circuit exceeds predetermined thresholds, further providing fairness as among the virtual circuits. In addition, each switching node or computer can generate link flow control messages for transmission to neighboring devices in the network to temporarily limit transmission thereto if the amount of resources taken up by all virtual circuits exceeds predetermined thresholds, so as to reduce the likelihood of message loss.

16 Claims, 7 Drawing Sheets

U.S. PATENT DOCUMENTS

| | | | | |
|---|---|---|---|---|
| 5,274,768 | A | * | 12/1993 | Traw et al. ................. 709/236 |
| 5,432,784 | A | | 7/1995 | Ozveren |
| 5,517,495 | A | | 5/1996 | Lund et al. |
| 5,557,607 | A | | 9/1996 | Holden |
| 5,610,921 | A | | 3/1997 | Christensen |
| 5,625,625 | A | | 4/1997 | Oskouy et al. |
| 5,629,928 | A | * | 5/1997 | Calvignac et al. .......... 370/237 |
| 5,664,116 | A | | 9/1997 | Gaytan et al. |
| 5,850,395 | A | | 12/1998 | Hauser et al. |
| 5,896,511 | A | * | 4/1999 | Manning et al. ............ 709/232 |
| 5,935,213 | A | * | 8/1999 | Rananand et al. .......... 370/229 |
| 5,995,486 | A | * | 11/1999 | Iliadis ........................ 370/229 |
| 6,094,712 | A | | 7/2000 | Follett et al. |
| 6,115,748 | A | | 9/2000 | Hauser et al. |

OTHER PUBLICATIONS

Shin et al, Integrated Rate and Credit Feedback Control for ABR Service in ATM network, IEEE, pp. 1295-1303, 1997.*

Asynchronous Transfer Mode (ATM) Technical Overview, IBM, pp. 1-286, Oct. 1995.*

Jain, "Congestion Control and Traffic Management in ATM Networks: Recent Advances and a Survey", The Ohio State University, pp. 1-29, Jan. 26, 1995.

Osborne et al., "DART—A Low Overhead ATM Network Interface Chip", MERL—A Mitsubishi Electric Research Laboratory, pp. 1-12, Jul. 1996.

Boden, et al., "Myrinet—A Gigabit-per-Second Local-Area Network", Myricom, Inc., IEEE, pp. 1-15, Feb. 1995.

"Virtual Interface Architecure Specification", Draft Revision 1.0, download from http://www.viaorg.org, pp. 1-83, Dec. 4, 1997.

"Congestion Control Protocols For Interconnected LANs Supporting Voice and Data Traffic," by Roussos et al., *Butterworth-Heinemann Ltd.*, vol. 17, Jan. 1, 1994 (pp. 25-34).

* cited by examiner

SYSTEM AND METHOD FOR REGULATING MESSAGE FLOW IN A DIGITAL DATA NETWORK

INCORPORATION BY REFERENCE

This application is a continuation of U.S. application Ser. No. 09/065,118, filed on Apr. 23, 1998 now U.S. Pat. No. 6,570,850; the disclosure of the prior application is considered part of (and is incorporated by reference in) the disclosure of this application.

U.S. patent application Ser. No. 09/065,115, filed Apr. 23, 1998 in the name of Shawn A. Clayton, et al., and entitled "System And Method For Scheduling Message Transmission And Processing In A Digital Data Network", assigned to the assignee of the instant application, incorporated by reference.

FIELD OF THE INVENTION

The invention relates generally to the field of digital communications systems and more particularly to digital networks for facilitating communication of digital data in, for example, digital image, audio and video distribution systems and among digital computer systems. The invention is more particularly directed to flow control and scheduling arrangements for regulating the flow of information through the network to avoid congestion, prevent loss of data and preserve fairness among a plurality of devices that are transferring information over the network.

BACKGROUND OF THE INVENTION

Digital networks have been developed to facilitate the transfer of information, including data and programs, among digital computer systems and other digital devices. A variety of types of networks have been developed and implemented using diverse information transfer methodologies. In some networks, such as the well-known Ethernet, a single wire is used to interconnect all of the devices connected to the network. While this simplifies wiring of the network in a facility and connection of the devices to the network, it results in generally slow information transfer, since the wire can only carry information, in the form of messages, from a single device at a time. To alleviate this to some extent, in some Ethernet installations, the network is divided into a number of sub-networks, each having a separate wire, with interfaces interconnecting the wires. In such installations, wires can carry messages for devices connected thereto simultaneously, which increases the number of messages that can be transferred simultaneously. It is only when a device connected to one wire needs to send a message to a device connected to another wire that wires in two or more sub-networks will be used, making them unavailable for use by other devices connected thereto.

To further alleviate this, networks have been developed in which communications are handled through a mesh of switching nodes. The computer systems and other devices are connected to various switching nodes. Since the switching nodes themselves are interconnected in a variety of patterns, a number of paths may be available between pairs of the devices, so that if one path is congested, another may be used. Such an arrangement may result in a network which is more complicated than an Ethernet network, but it can provide substantially higher information transfer rates, particularly if optical fiber is used as the media interconnecting the switching nodes and devices. A problem which may arise with such networks is that, in such networks, a switching node or a device, when it is receiving information from another switching node or device in the network, does not have a mechanism to provide "flow-control" information to the transmitting switching node or device. While this does reduce the cost of a network, it may result in congestion, in which either a switching node may receive information at a rate faster than it can transmit it, or a destination device may receive information at a rate faster than it can buffer and process it.

SUMMARY OF THE INVENTION

The invention provides anew and improved flow control arrangement for regulating message flow in a communications network.

In brief summary, the invention in one embodiment provides a system comprising at least two devices interconnected by a network including at least one communication link. Each device includes a network interface for transferring messages over the network. At least one of the devices as a source device, transmits messages over one or more virtual circuits established over the network, and at least one other of said devices, as a destination device for the respective virtual circuits, receives the messages thereover. The network interface of the destination device includes a receive section including a buffer configured to buffer messages received over all virtual circuits for which the device is a destination device, and a destination flow control circuit. The destination flow control circuit (i) generates a virtual circuit flow control message associated with a virtual circuit for which the device is a destination device for transfer over the communication link to the source device for the virtual circuit when the portion of said buffer occupied by messages received over the one virtual circuit exceeds a selected virtual circuit flow control threshold level, and (ii) generates a link flow control message for transmission over said communication link when the portion of said buffer occupied by messages exceeds a selected link flow control threshold level. The network interface of the source device includes a transmit section configured to transmit messages over the virtual circuit(s) for which it is source device, and a source flow control circuit. The source flow control circuit (i) in response to receipt by said source device of a virtual circuit flow control message associated with a virtual circuit, disables the transmit section from transmitting messages over the virtual circuit, and (ii) in response to receipt by the source device of a link flow control message over the communication link connected thereto, disables the transmit section from transmitting messages over the communication link. Accordingly, the destination device, by transmitting the virtual circuit flow control messages for a virtual circuit when the virtual circuit's occupancy of the buffer exceeds the virtual circuit flow control threshold level, limits the amount of its buffer resources that will be occupied by messages associated with any one virtual circuit, effectively ensuring fairness among all virtual circuits for buffer resources. In addition, the destination device, by transmitting link flow control messages, will ensure that the buffer does not overflow, which can result in message loss.

In another embodiment, the network includes a switching node which forms part of the path for one or more virtual circuits between the source device and the destination device. The switching node is connected to receive messages transmitted by the source device over the virtual circuit(s) for which it forms part of the path over one communication link connected thereto, buffer the received messages in an internal buffer, and transmit the buffered messages over the virtual circuit(s) over another communication link connected thereto, thereby to forward messages for the virtual circuit(s) downstream over the respective virtual circuit(s). If the switching node receives a virtual circuit flow control message for a virtual circuit over the communication link over which it would transmit messages over the virtual circuit, it will forward the virtual circuit flow control message over the communication link over which it would receive messages for the virtual circuit, thereby to forward the virtual circuit flow control message upstream over the virtual circuit. If the switching node receives a link flow control message over a communication link, it will stop transmitting messages thereover. In addition, if the occupancy of the switching node's buffer by messages from a particular virtual circuit exceeds a selected virtual circuit threshold level, which in one embodiment varies based on the number of virtual circuits for which the switching node forms part of the path, the switching node will generate and transmit a virtual circuit flow control message over the communication link over which it would receive messages for the virtual circuit, thereby to forward the virtual circuit flow control message upstream over the virtual circuit to disable the source device for that virtual circuit from transmitting messages thereover. If the occupancy of the switching node's buffer exceeds a selected link threshold level, the switching node will generate and transmit link flow control messages over the communication links connected thereto over which it receives messages. Accordingly, the switching node, by transmitting the virtual circuit flow control messages for a virtual circuit when the virtual circuit's occupancy of its buffer exceeds the virtual circuit flow control threshold level, limits the amount of its buffer resources that will be occupied by messages associated with any one virtual circuit, effectively ensuring fairness among all virtual circuits for buffer resources. In addition, the switching node, by transmitting link flow control messages, will ensure that its buffer does not overflow, which can result in message loss.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
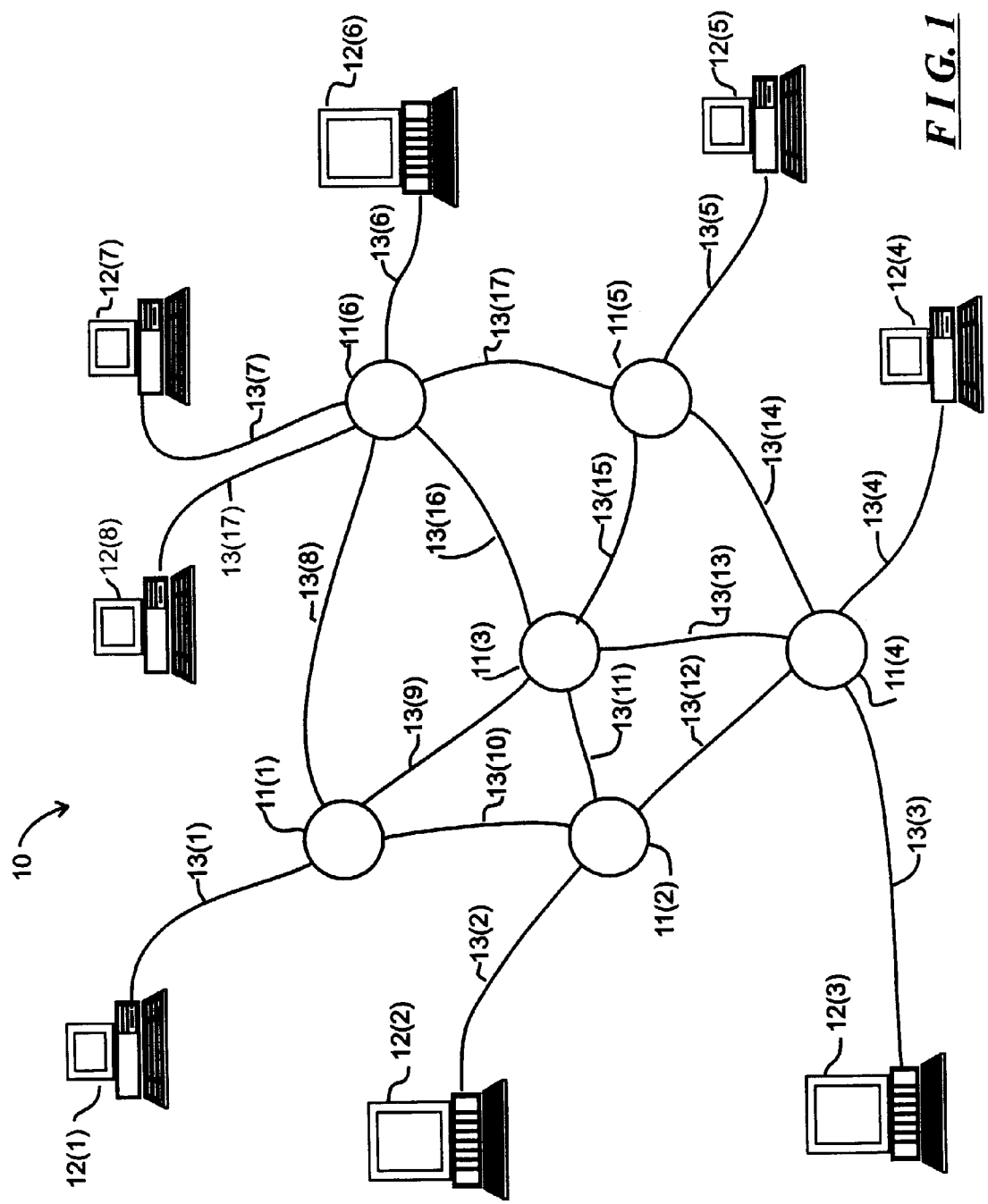
FIG. 1 schematically depicts a computer network in which a flow control arrangement in accordance with the invention is implemented.

FIG. 1 schematically depicts a computer network 10 including a plurality of switching nodes 11(1) through 11(N) (generally identified by reference numeral 11($n$)) for transferring signals representing data among a number of devices, which in FIG. 1 are represented by computers 12(1) through 12(M) (generally identified by reference numeral 12($m$)). The computers 12($m$), as is conventional, process data, in accordance with their program instructions to generate processed data. In their processing, a computer 12($m_S$) (subscript "S" referencing "source") may, as a source computer, need to transfer data, processed data and/or program instructions (all of which will be referred to herein generally as "information") to another, destination, computer 12($m_D$) (subscript "D" referencing "destination"), which may need to use the transferred information in its operations. Each computer 12($m$) is connected over a communication link, generally identified by reference numeral 13($p$), to a switching node 11($n$) to facilitate transmission of data thereto or the reception of data therefrom. The switching nodes 11($n$) receive, buffer and forward data received from the computers 11($n$) and from other switching nodes 11($n$) to facilitate the transfer of data among the computers 12($m$). The switching nodes 11($n$) are interconnected by communication links, also generally identified by reference numeral 13($p$) to facilitate the transfer of data thereamong. The communication links 13($p$) may utilize any convenient data transmission medium. Each communication link 13($p$) depicted in FIG. 1 is preferably bi-directional, allowing the switching nodes 11($n$) to transmit and receive signals among each other and with computers 12($m$) connected thereto over the same link; to accommodate bi-directional communication links, separate media may be provided for each communication link 13($p$), each of which facilitates unidirectional transfer of signals thereover.

In one embodiment, the data is transferred using the well-known "ATM" ("Asynchronous Transfer Mode") transfer methodology. That methodology is described in detail in C. Partridge, *Gigabit Networking*, (Reading MA: Addison Wesley Publishing Company, 1994), primarily in chapters 3 and 4, and D. McDysan, et al., ATM Theory And Application (McGraw Hill, 1995) and will not be described in detail. Generally, in the ATM methodology, the computers 12($m$) and the switching nodes 11($n$) transmit data in the form of fixed-length "cells" over "virtual circuits" established between computers 12($m$) through the network. Each virtual circuit essentially defines a path from a source computer 12($m_3$) to a destination computer 12($m_D$) through one or more switching nodes 11($n$) and over respective communication links 13($p$). In the ATM data transfer methodology, for a block of information to be transferred from a source computer 12($m_s$) to a destination computer 12($m_D$) over a virtual circuit established therebetween, the source computer 12($m_s$) allocates the data block to one or a series of "cells" for transmission serially over the communication link 13($p$). Each cell transferred through the network 10 includes a header portion and a data portion, with the header portion including virtual circuit identifier information for controlling the transfer of the cell through the network 10, along with protocol and other control information, including an "end of message" ("EOM") flag. The data portion contains data from the data block that is to be transferred in the cell. The data portion of each cell is of fixed, predetermined length, which, in one embodiment, is forty-eight bytes. The source computer 12($m_s$) will pad the data in the data portion of the cell (if one cell will accommodate the data block to be transferred) or the last cell in the series (if multiple cells are required to accommodate the data block to be transferred) if the amount of data in the block is not an integral multiple of the size of the data portion of each cell to ensure that the data portion of the last cell has the required length. If a series of cells are required to transfer a data block, the source computer $12(m_S)$ will transmit the cells so that the data in the data portions of the series of cells conform to the order of data in the data block that is being transferred. In addition, if cells are properly transferred to the destination computer $12(m_D)$, the destination computer will receive the cells in the same order. In the last cell in a series which contains information from a data block, the end of message flag in the header portion is set, thereby to notify the destination computer $12(m_D)$ that it has received all of the cells containing data for the data block.

The invention provides an arrangement for enabling the computers $12(m)$ and switching nodes $11(n)$ to control the flow of cells over the network to avoid or reduce the likelihood that congestion will develop both at the switching nodes $11(n)$ and at the destination computer, which may otherwise lead to degradation in the cell transfer throughput or loss of cells in the network. The invention further provides an arrangement for scheduling operations by the computers $12(m)$ and switching nodes $11(n)$ to generally facilitate fairness in the transfer of information and reasonable latency in the transfer of small messages over the various virtual circuits established through the network 10. Generally, in connection with flow control, the computers $12(m)$ and switching nodes $11(n)$ implement flow control in two modes, identified herein as a virtual circuit flow control mode and a link flow control mode. In the virtual circuit flow control mode, if a computer $12(m)$, operating as destination computer $12(m_D)$ for a virtual circuit, is receiving cells associated with the virtual circuit at rate that is too fast for it to process (as will be described below), the destination computer $12(m_D)$, operating in the virtual circuit flow control mode, will enter a set virtual circuit flow control state in which it enables flow control for the virtual circuit. In that operation, the destination computer $12(m_D)$ will generate a set virtual circuit flow control message and transmit it upstream along the path for the virtual circuit, that is towards the source computer $12(m_S)$ for the virtual circuit. Each switching node $11(n)$ along the path for the virtual circuit from the destination computer $12(m_D)$ to the source computer $12(m_S)$ will also enter a set virtual circuit flow control state for the virtual circuit. When the source computer $12(m_S)$ for the virtual circuit receives the set virtual circuit flow control message, it will effectively stop transmitting cells associated with that virtual circuit.

Each switching node $11(n)$ along the path for the virtual circuit, if it is receiving cells associated with the virtual circuit at a rate that is, for example, too fast for it to forward downstream along the path for the virtual circuit (as also described below), can also, operating in the virtual circuit flow control mode, enter a set virtual circuit flow control state and generate a set virtual circuit flow control message and transmit it upstream along the path for the virtual circuit. The upstream switching nodes $11(n)$, if any, along the path for the virtual circuit to the source computer $12(m_S)$, and source computer $11(m_S)$, will operate in the same manner as described above.

When the destination computer $12(m_D)$ can resume receiving cells for that virtual circuit, it will enter a clear virtual circuit flow control state, in which it will generate a clear virtual circuit flow control message and transmit it upstream along the path for the virtual circuit. If a switching node $11(n)$ receives the clear virtual circuit flow control message and it is not itself in the set virtual circuit flow control state, it will forward the clear virtual circuit flow control message upstream along the path for the virtual circuit to the upstream switching node $11(n)$, if any, along the path to the source computer $12(mS)$, or to the source computer $12(m_S)$ for the virtual circuit. On the other hand, if a switching node $11(n)$ receives the clear virtual circuit flow control message and it is itself in the set virtual circuit flow control state, it will delay forwarding the clear virtual circuit flow control message until it leaves the set virtual circuit flow control state, at which point it will forward the clear virtual circuit flow control message upstream along the path for the virtual circuit. When the source computer $12(m_S)$ receives a clear virtual circuit flow control message, it can resume transmitting cells associated with the virtual circuit downstream over the virtual circuit. It will be appreciated that, by allowing a switching node $11(n)$ to delay forwarding of the clear virtual circuit flow control message upstream along the path for the virtual circuit while it is in the set virtual circuit flow control state, that will allow the switching node $11(n)$ to forward cells for the virtual circuit and thereby reduce the number of cells that it may have been buffering for the virtual circuit, before enabling an upstream switching node $11(n)$ or the source computer $12(m_S)$ to resume transmitting cells thereto.

The link flow control mode is implemented on a communication link-basis, instead of on a per-virtual circuit basis. Thus, in the link flow control mode, if a computer $12(m)$ is receiving cells from the switching node $11(n)$ connected thereto at rate that is too fast for it to process (as will also be described below), the computer $12(m)$, operating in the link flow control mode, will enter a set link flow control state in which it enables flow control for the communication link. In that operation, the computer $12(m)$ will generate a set link flow control message and transmit it to the switching node $11(n)$ connected thereto over that link. When the switching node $11(n)$ receives the set link flow control message, it will stop transmitting cells thereto over that link. Similarly, each switching node $11(n)$, if it is receiving cells at a rate that is, for example, too fast for it to forward (as also described below), it can also, operating in the link flow control mode, enter a set link flow control state and generate respective set link flow control messages and transmit them other switching nodes $11(n)$ or computers $12(m)$ connected thereto which are transmitting cells thereto; when those switching nodes $11(n)$ or computers $12(m)$ receive the set link flow control messages, they will also stop transmitting cells to the switching node $11(n)$ from which the respective set link flow control message was received.

When the computer $12(m)$ can resume receiving cells from the switching node $11(n)$ over the communication link $13(p)$, it will enter a clear link flow control state and generate a clear link flow control message and transmit it to the switching node $11(n)$. When the switching node $11(n)$ receives the clear link flow control message, it can resume transmitting cells to the computer $12(m)$. Similarly, when a switching node $11(n)$ operating in the set link flow control state can resume receiving cells, it can enter a clear link flow control state, generate respective clear link flow control message and transmit them to switching nodes $11(n)$ and/or computers $12(m)$ connected thereto. In either case, the switching nodes $11(n)$ and computers $12(m)$, after receiving respective clear link flow control messages, can resume transmitting cells to the switching node $11(n)$ or computer $12(m)$ from which they received the clear link flow control messages.

Providing separate virtual circuit flow control and link flow control modes provides several benefits. For example, the virtual circuit flow control mode can be used to provide general fairness for cell transmission bandwidth through the network as among virtual circuits which terminate at each destination computer $12(m_D)$ or for which each switching node 11(n) forms part of the path. The virtual circuit flow control mode can also be used to reduce the likelihood that excessive congestion will develop. On the other hand, the link flow control mode can be used if excessive congestion does develop, to prevent, or at least reduce the likelihood that, cells will be received by a computer 12(m) or switching node 11(n) at a rate which will overflow buffers provided thereby, which, in turn, can lead to cell loss. In one embodiment, the various flow control messages, that is, set and clear virtual circuit flow control messages and set and clear link flow control messages are relatively short, including a message type flag that identifies the type of message, that is, a set virtual circuit flow control message, a clear virtual circuit flow control message, a set link flow control message and a clear virtual circuit message, and an identifier portion. If the identifier portion contains a predetermined value, which in one embodiment is "zero," the message is a set or clear link flow control message, depending on the value of the message type flag. On the other hand, if the identifier portion contains a value other than the predetermined value, the message is a set or clear virtual circuit flow control message, also depending on the value of the message type flag, with the value in the identifier portion identifying the virtual circuit with which it is associated. Since the set and clear virtual circuit and link flow control messages are relatively short, only a small amount of bandwidth through the network is required to transfer them.

Figure 2:
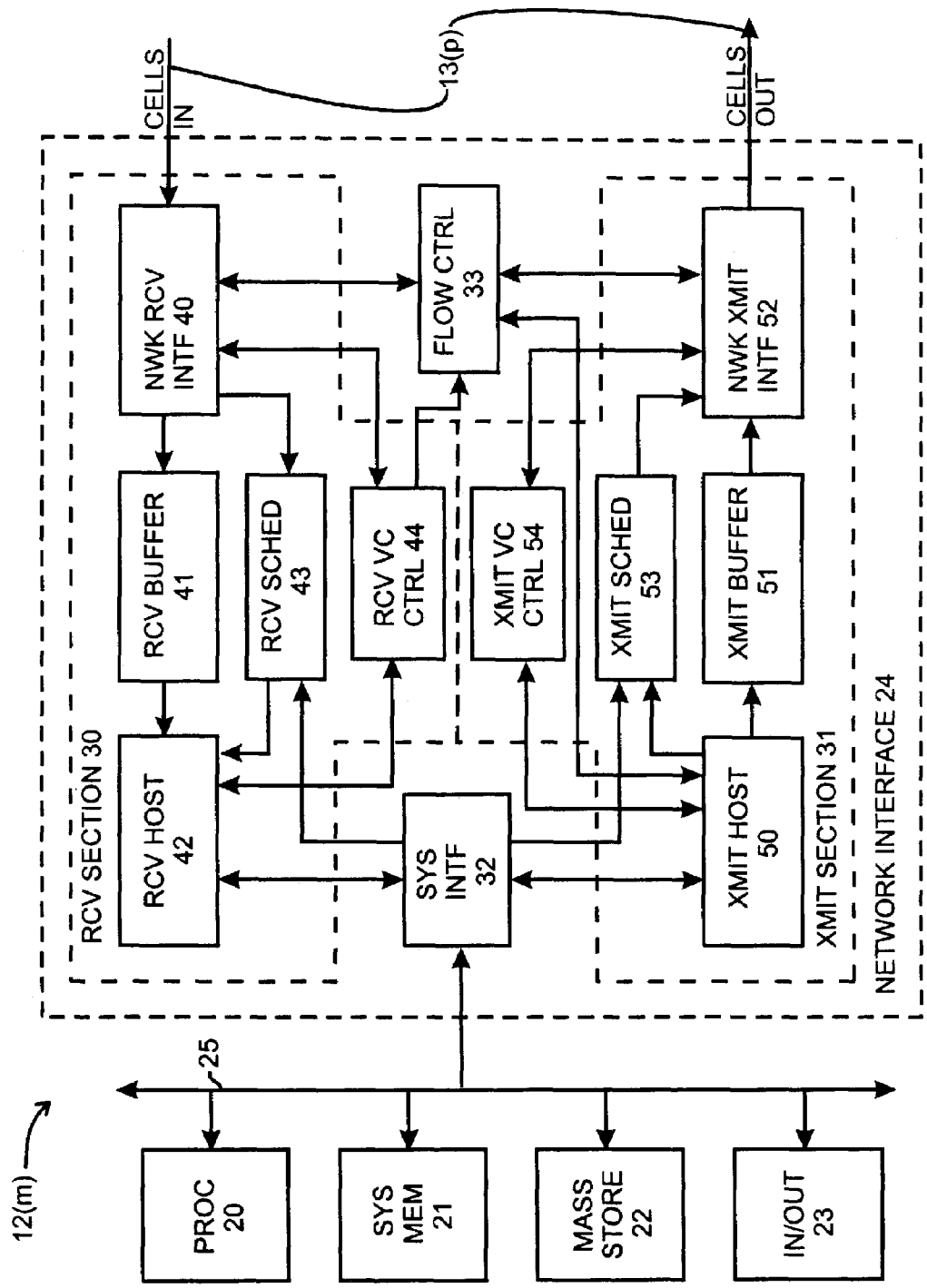
FIG. 2 is a functional block diagram of a computer system for use in the computer network depicted in FIG. 1.
Figure 3:
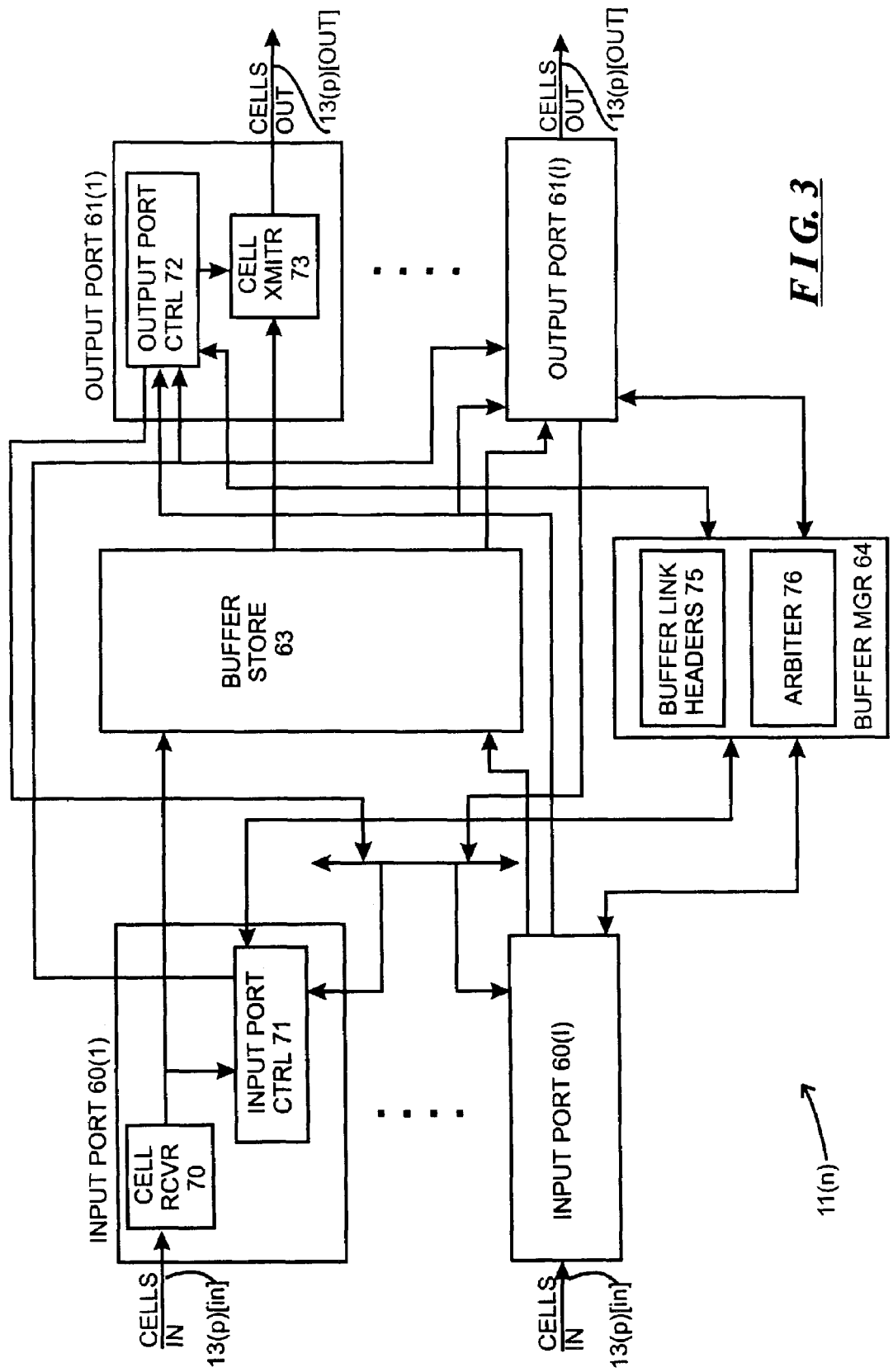
FIG. 3 is a functional block diagram of a switching node for use in the computer network depicted in FIG. 1.

Before proceeding to a detailed description of the flow control arrangement used in system 10, it would be helpful to describe the structure and operation of computer 12(m) and switching node 11(n) used in one embodiment of system 10. FIG. 2 depicts a functional block diagram of a computer 12(m) for use in connection with the network 10, and FIG. 3 depicts a functional block diagram of a switching node 11(n) for use in connection with network 10. Generally, a computer 12(m) may comprise any type of conventional computer, including a conventional personal computer or computer workstation, server computer, mini- or mainframe computer, or the like. With reference to FIG. 2, computer 12(m) includes a processor 20, system memory 21, mass storage subsystem 22, input/output subsystem 23 and a network interface 24 all interconnected by an interconnection arrangement 25. In one embodiment, the interconnection arrangement 25 includes a conventional PCI bus. The processor 20 processes one or more application programs under control of an operating system. In specific connection with transfers of data over the network 10, (i) for transfers in which the computer 12(m) operates as a source computer 12($m_S$), the processor 20 can establish buffers (not separately shown) in the system memory 21 in which it loads blocks of data to be transferred to other computers as destination computers 12($m_D$), and (ii) for transfers in which the computer 12(m) operates as a destination computer 12($m_D$) the processor 20 can establish buffers (also not separately shown) in the system memory 21 in which blocks of data received from other computers as source computers 12($m_S$), as described, for one embodiment, in the Virtual Interface Architecture ("VIA") specification, Version 1 (Dec. 16, 1997), published by Compaq Computer Corp., Intel Corp. and Microsoft Corp.

The mass storage subsystem generally provides long-term storage for information which may be processed by the processor 20. The mass storage subsystem 22 may include such devices as disk or tape subsystems, optical disk storage devices and CD-ROM devices in which information may be stored and/or from which information may be retrieved. The mass storage subsystem 22 may utilize removable storage media which may be removed and installed by an operator, which may allow the operator to load programs and data into the computer 12(m) and obtain processed data therefrom.

The input/output subsystem 23 includes operator input and output subsystems that generally provide an operator interface to the digital computer 10. In particular, operator input subsystems may include, for example, keyboard and mouse devices, which an operator may use to interactively input information to the digital computer 10 for processing. In addition, the operator input subsystems may provide mechanisms whereby the operator may control the digital computer 10. The operator output subsystems may include devices such as video display devices, through which the digital computer 10, under control of the microprocessor 11, displays results of processing to the operator. In addition, a printer may be provided to provide a hardcopy output for the operator.

The network interface 24 retrieves data from the system memory 21 that is to be transferred to other computers operating as destination computers 12 ($m_D$), generates cells therefrom and transfers the generated cells over the communication link 13(p). In addition, the network interface 24 receives cells from the communication link 13(p), extracts the data therefrom and transfers the data to appropriate buffers in the system memory 21 for storage. The network interface 24 includes a number of components, including a receive section 30, a transmit section 31, a system interface circuit 32 and a flow control circuit 33. The receive section 30 connects to the communication link 13(p) and receives cells received thereover, buffers the data from the received cells, and cooperates with the system interface circuit 32 to transfer the buffered data over interconnection arrangement 25 to the system memory 21 for storage for use by applications being processed by the computer 12(m). The transmit section 31 cooperates with the system interface circuit 32 to retrieve data to be transmitted from the system memory 21 over interconnection arrangement 25, generates cells and transmits them over the communication link 13(p). In one embodiment, the system interface circuit 32 operates in a DMA (direct memory access) manner to retrieve data from the system memory 21 for transmission by the transmit section 31, and to transfer data received by the receive section 30 to the system memory 21 for storage. The system interface circuit 32 also operates to receive control information from the processor 20 for storage in various control registers (not shown) which control operations of the receive section 30, transmit section 31, flow control circuit 33 as well as the system interface circuit 32 itself.

As noted above, the receive section 30 operates to receive cells from the communication link 13(p) that is connected to the computer 12(m), buffer the data from the received cells and, in cooperation with the system interface circuit 32, transfer the buffered data to the system memory 21 for storage. The receive section 30 includes a number of components, including a network receive interface circuit 40, a receive buffer 41, a receive host circuit 42, a receive scheduler 43 and a receive virtual circuit control circuit 44. The network receive interface circuit 40 receives cells, identified as "CELLS IN" from the communication link 13(p) connected to the computer 12(m) and buffers the data in the data portion of each cell in the receive buffer 41. As noted above, cells are transmitted through the network 10 over virtual circuits, and the network receive interface circuit 40 will generally aggregate the data from cells associated with a particular virtual circuit in the receive buffer 41. In one embodiment, the data in the receive buffer 41 associated with a particular virtual circuit is stored in a linked list, and, when the network receive interface circuit 40 receives a cell associated with a particular virtual circuit, it will buffer the data from the cell in the receive buffer 41 and link it to the end of the linked list associated with the virtual circuit with which the cell was associated.

The receive virtual circuit control circuit 44 stores information for each virtual circuit over which the network interface 24 receives cells, including, for each virtual circuit, a pointer to locations in the system memory 21 in which data received therefor is to be stored, and pointers to the locations of the head and tail of the linked list, if any, that is associated with the virtual circuit and a number of buffered cells value which identifies the number of received cells associated with the virtual circuit whose data is currently being buffered in the receive buffer 41. While the receive buffer 41 is not buffering any data from cells associated with a particular virtual circuit, the receive virtual circuit control circuit 44 will indicate that no linked list exists for the virtual circuit, but as long as there is data from at least one cell associated with a virtual circuit, the receive virtual circuit control circuit 44 will contain linked list information for the virtual circuit; it will be appreciated that, if the receive buffer 41 is buffering data from only one cell associated with a particular virtual circuit, the head and tail pointers will point to the same location, namely, the location in receive buffer 41 which stores that data. When the network receive interface circuit 40 has data from a received cell and buffers it in the receive buffer 41, it can use the information in the receive virtual circuit control circuit 44 to determine whether a linked list exists for the virtual circuit. If the receive virtual circuit control circuit 44 indicates that no linked list exists for the virtual circuit, the network receive interface circuit 40 can load a pointer to the location in receive buffer 41 in which the data from the cell was stored in the receive virtual circuit control circuit 44 as both the head and tail pointer for the linked list, and increment the number of buffered cells value; in this condition, the number of buffered cells value will be "one." On the other hand, if the receive virtual circuit control circuit 44 indicates that a linked list exists, the network receive interface circuit 40 will link the just-stored data to the tail of the linked list that is associated with the virtual circuit that is, in turn, associated with the received cell. In addition, the network receive interface circuit 40 will update the tail pointer in the receive virtual circuit control circuit 44 to point to the location of the just-stored data as the new tail of the linked list, and increment the number of buffered cells value.

The receive host 42 retrieves buffered data from the receive buffer 41 and, in cooperation with the system interface circuit 32, transfers the buffered data to the system memory 21 over interconnection arrangement 25 for storage. The receive host 42 also makes use of the virtual circuit information in the receive virtual circuit control circuit 44 to identify locations in the receive buffer 41 which contain data associated with each particular virtual circuit which is to be transferred to the system memory 21 for storage. In particular, when the receive host 42 is to retrieve data from the receive buffer 41 for a particular virtual circuit for transfer to the system memory 21, it (that is, the receive host 42) can make use of the head pointer pointing to the location of the head of the linked list for the virtual circuit. In one embodiment, the network interface 24 can, in a single transfer, transfer buffered data from one cell or blocks of multiple cells over interconnection arrangement 25 to the system memory 21. In any case, after the receive host 42 has retrieved data from the receive buffer 41 that is associated with a cell from the head of the linked list that is associated with the cell's virtual circuit, it (that is, the receive host 42) will update the head pointer for the virtual circuit as maintained by the receive virtual circuit control circuit 44 to point to the next location, if any, in the receive buffer 41 for the linked list in which data is stored for the virtual circuit, and will decrement the number of buffered cells value for the virtual circuit. If the just-retrieved data is the last for the virtual circuit, the receive host 42 can decrement the number of buffered cells value to zero thereby to indicate that there is no linked list associated with the virtual circuit in the receive buffer 41.

The receive scheduler 43 enables the network receive interface circuit 40 to communicate with the receive host 42 to control the scheduling of the above-described operations performed by the receive host 42. The receive scheduler 43 also enables the processor 20 to communicate with the receive host 42 to control certain operations by the receive host 42 under control of the application programs being processed by the computer 12(*m*), to, for example, notify the receive host 42 of the buffers in the system memory 21 in which data received in cells associated with respective virtual circuits is to be stored. Operations performed by the receive scheduler 43 in connection with processor 20, network receive interface circuit 40 and receive host 42 are described below in connection with FIG. 5.

As further noted above, the transmit section 31 cooperates with the system interface circuit 32 to retrieve data to be transmitted from the system memory 21 over interconnection arrangement 25, generates cells and transmits them over the communication link 13(*p*). The transmit section 31 includes a number of components, including a transmit host 50, a transmit buffer 51, a network transmit interface circuit 52, a transmit scheduler 53 and an transmit virtual circuit control circuit 54.

The transmit host 50, in cooperation with the system interface circuit 32, retrieves from the system memory 21 over interconnection arrangement 25 data to be transmitted in cells over the communication link 13(*p*) and buffers it (that is, the retrieved data) in the transmit buffer 51. The transmit virtual circuit control circuit 54 stores information for each virtual circuit, including pointers to locations in system memory 21 from which data to be transmitted is to be retrieved for the respective virtual circuits and virtual circuit status information. As with the receive buffer 41, the transmit buffer 51 aggregates the data to be transmitted in cells associated with a particular virtual circuit in a linked list, and the transmit virtual circuit control circuit 54 also stores linked list head and tail pointers and a number of buffered cells value for each virtual circuit for which the transmit buffer is buffering data to be transmitted. Thus, when the transmit host 50 stores data that is to be transferred that is associated with a particular virtual circuit in the transmit buffer 51, it accesses the information for the virtual circuit in the transmit virtual circuit control circuit 54 to determine whether a linked list exists in the transmit buffer that is associated with the virtual circuit. If the transmit host 50 determines that no such linked list exists, which will be the case if the number of buffered cells value associated with the virtual circuit has the value "zero," it (that is, the transmit host 50) can provide a pointer to the location in the transmit buffer 51 in which the data is stored as both the head and tail pointer for the virtual circuit, and in addition increment the number of buffered cells value, in the transmit virtual circuit control circuit 54. On the other hand, if the transmit host 50 determines that a linked list exists for the virtual circuit over which data that it just stored in the transmit buffer 51, it (that is, the transmit host 50) will update the tail pointer for the virtual circuit as maintained by the transmit virtual circuit control circuit 54 to point to the location in the transmit buffer 51 in which the data was stored, and will increment the number of buffered cells value for the virtual circuit.

The network transmit interface circuit 52 retrieves data from the transmit buffer 51 and generates therefrom cells, identified as "CELLS OUT," for transmission over the communication link 13(*p*) connected to the computer 12(*m*). In that operation, when the network transmit interface circuit 52 retrieves data associated with a particular virtual circuit from the transmit buffer 51, it will retrieve the data from the head of the linked list associated with the virtual circuit and in that operation will use the linked list information, in particular the head pointer, that is stored in the transmit virtual circuit control circuit 54 for the particular virtual circuit. After the network transmit interface circuit 52 has retrieved data from the transmit buffer 51 that is associated with a cell from the head of the linked list that is associated with the cell's virtual circuit, it (that is, the network transmit interface circuit 52 will update the head pointer for the virtual circuit as maintained by the transmit virtual circuit control circuit 54 to point to the next location, if any, in the receive buffer 41 for the linked list in which data is stored for the virtual circuit, and will decrement the number of buffered cells value for the virtual circuit. If the just-retrieved data is the last for the virtual circuit, the network transmit interface circuit 52 can decrement the number of buffered cells value to zero thereby to indicate that there is no linked list associated with the virtual circuit in the transmit buffer 51.

The transmit scheduler 53 enables the transmit host 50 to communicate with the network transmit interface circuit 52 to control the scheduling of the above-described operations performed by the network transmit interface circuit 52. The transmit scheduler 53 also enables the processor 20 to communicate with the transmit host 50 to control certain operations by the transmit host 50 under control of the application programs being processed by the computer 12(*m*), to, for example, notify the transmit host 50 of particular buffers in the system memory 21 in which data to be transmitted in cells associated with respective virtual circuits is stored. Operations performed by the processor 20, transmit host 50 and network transmit interface circuit 52 in connection with the transmit scheduler 53 are described below in connection with FIG. 6.

In connection with one aspect of the invention, the flow control circuit 33 performs several operations in connection with (i) regulating the rate of transmission of cells by the transmit section 31, and (ii) enabling the transmit section to transmit virtual circuit and link flow control messages over communication link 13(*p*), as appropriate.

In connection with (i) above, the flow control circuit 33 will (a) after receiving a set virtual circuit flow control message, disable the transmit section 31 from transmitting cells associated with a particular virtual circuit, until a clear virtual circuit flow control message is received; after receiving the set virtual circuit flow control message, the flow control circuit 33 disables the transmit host 50 from retrieving data from the system memory 21 for transmission over that virtual circuit (in one embodiment, the network transmit interface 52 can continue transmitting cells for previously-retrieved data that is buffered in the transmit buffer 51), and (b) after receiving a set link flow control message, disable the network transmit interface 52 from transmitting cells over the communication link 13(*p*), until a clear link flow control message is received.

In connection with (ii) above, the flow control circuit 33 will generate set and clear virtual circuit and link flow control messages for transmission by the network transmit interface 52 based on both the total amount of data being buffered in the receive buffer 41 (which will be referred to herein as the "total receive buffer occupancy level") and the amount of data being buffered in the receive buffer 41 for a particular virtual circuit (which will be referred to herein as the "per-virtual circuit receive buffer occupancy level"), which the flow control circuit 33 can determine based on the information in the receive virtual circuit control circuit 44. Certain operations performed by the flow control circuit 33 will be described in connection with flow diagrams depicted in FIG. 4. Generally, the flow control circuit 33 operates in four states, which are identified as a non-flow controlled state, a normal congestion state, a medium congestion state and a high congestion state. These states are determined by the total receive buffer occupancy level in relation to various threshold values. Thus, the flow control circuit 33 will be operating in the non-flow controlled state if the total receive buffer occupancy level is below a relatively low "no flow control" threshold value. On the other hand, the flow control circuit 33 will be operating in the normal congestion state if the total receive buffer occupancy level is between the no flow control threshold value and a somewhat higher "congestion mode" threshold value, in the medium congestion state if the total receive buffer occupancy level is between the congestion mode threshold value and a relatively high "link mode" threshold value, and in the high congestion state if the total receive buffer occupancy level is above the link mode threshold value. If the flow control circuit 33 is operating in (a) the non-flow controlled state, then it will not enable the network transmit interface circuit 52 to transmit any set virtual circuit or link flow control messages, and, on a round robin basis in order of virtual circuit identifier, it will place those virtual circuits which are in the set virtual circuit flow control state in the clear virtual circuit flow control state and enable the network transmit interface circuit 52 to transmit clear virtual circuit flow control messages therefor;

(b) the normal congestion state, then (I) for each virtual circuit whose per-virtual circuit receive buffer occupancy level is above a selected per-virtual circuit receive buffer flow control threshold value, it will place the virtual circuit in the set virtual circuit flow control state and enable the network transmit interface circuit 52 to transmit a set virtual circuit flow control message therefor; but (II) for any virtual circuits in the set virtual circuit flow control state, but whose per-virtual circuit receive buffer occupancy levels are below the selected per-virtual circuit receive buffer flow control threshold value, it will, on a round-robin basis in order of virtual circuit identifier, place the virtual circuits in the clear virtual circuit flow control state and enable the network transmit interface circuit 52 to transmit clear virtual circuit flow control messages therefor;

(c) the medium congestion state, then it will place each virtual circuit for which the receive section receives a cell in the set virtual circuit flow control mode and enable the network transmit interface circuit 52 to transmit a set virtual circuit flow control message therefor; and (d) the high congestion state, then it will enable the network transmit interface circuit 52 to transmit a set link flow control message.

If the flow control circuit 33 sequences from the high congestion state to any of the other states, it will enable the network transmit interface circuit 52 to transmit a clear link flow control message. By, in the normal congestion state, sequencing the virtual circuits that are in the set virtual circuit flow control state, but whose per-virtual circuit receive buffer occupancy levels are below the selected per-virtual circuit receive buffer flow control threshold value, to the clear virtual circuit flow control state on a round-robin basis in order of virtual circuit identifier, the flow control circuit 33 will provide a degree of fairness as among the virtual circuits.

Figure 4:
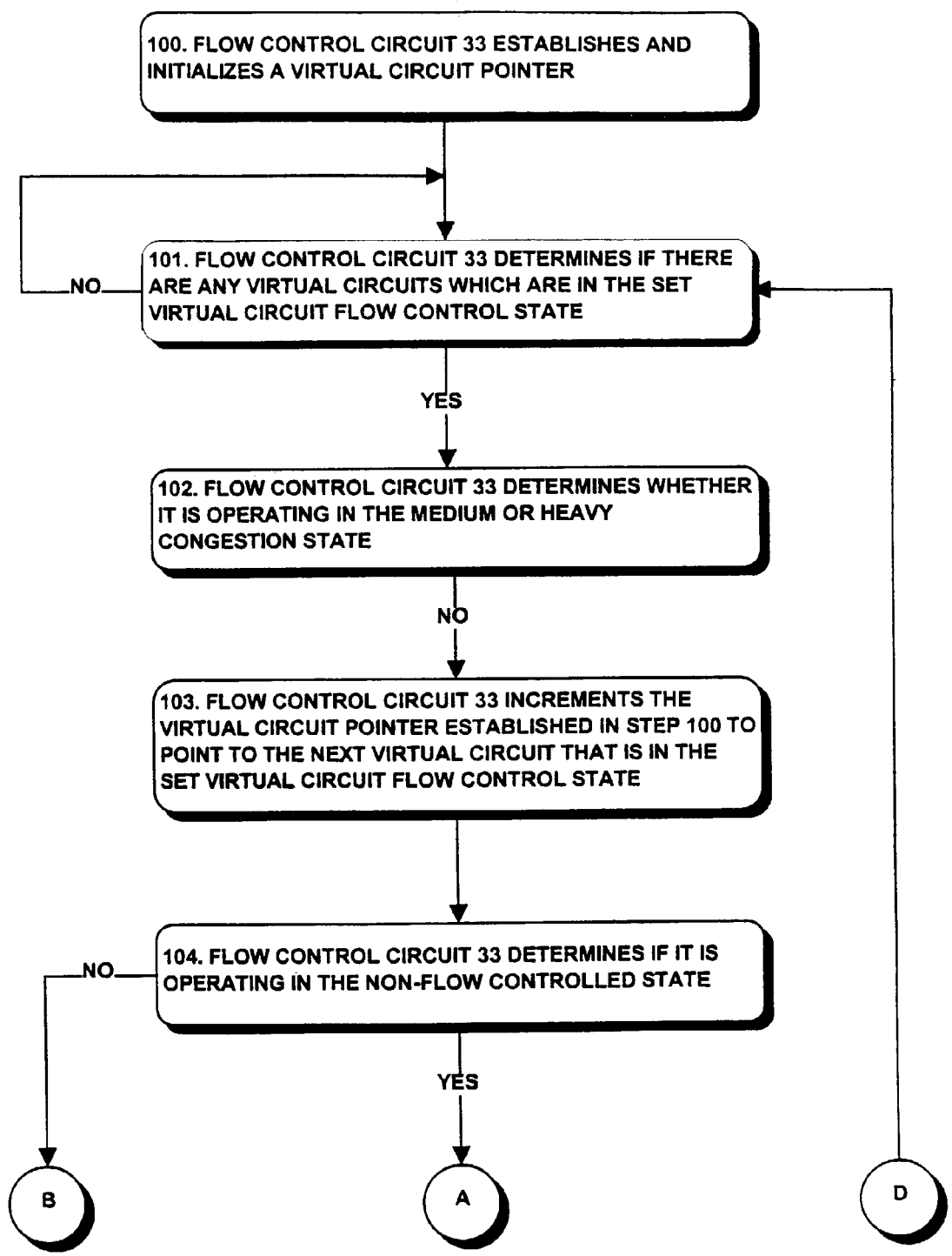
FIG. 4. is a flowchart detailing operations of a computer system in connection with the invention.
Figure 4A:
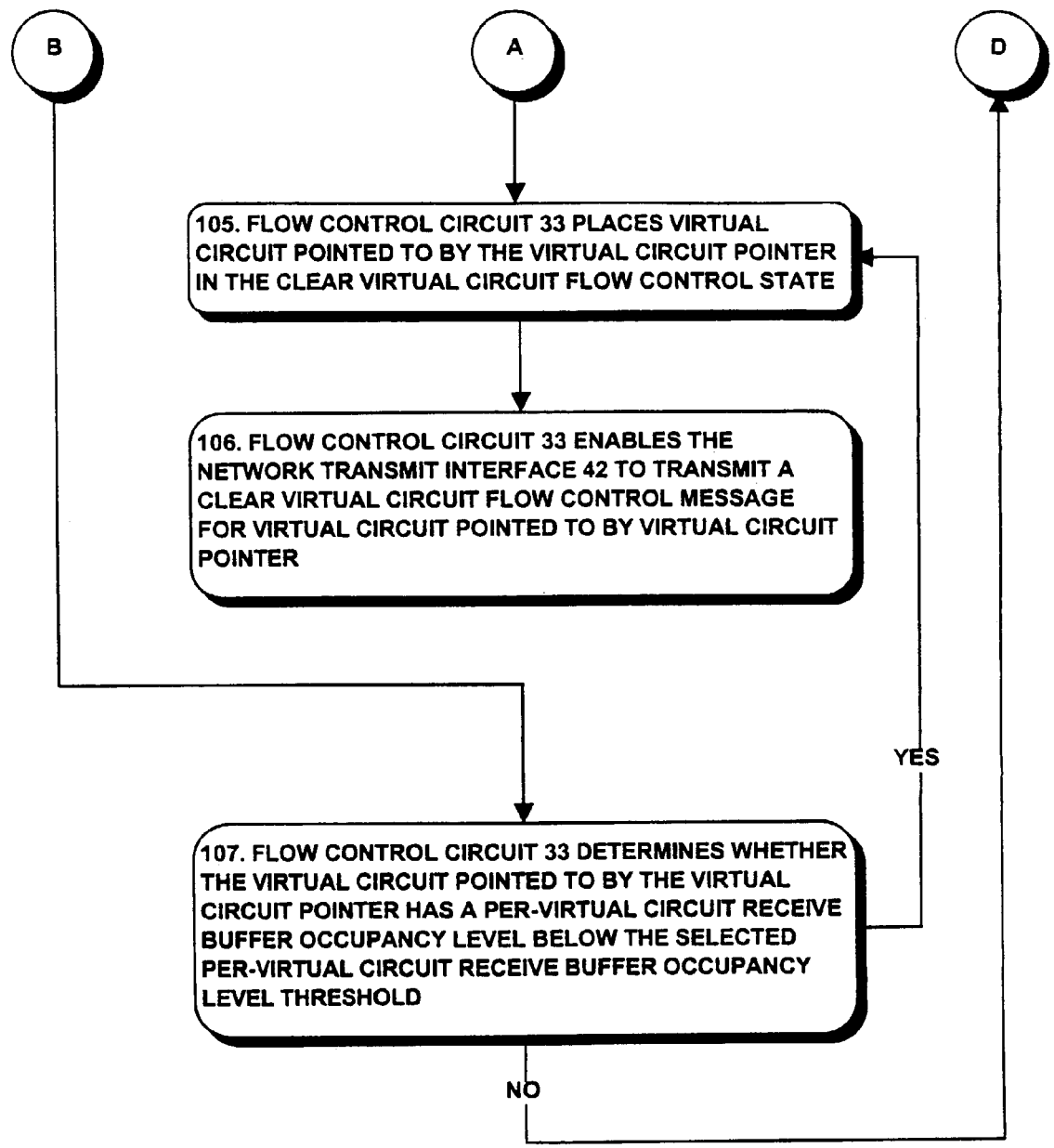

The operations performed by the flow control circuit 33 in connection with the determination as to whether to generate and send clear virtual circuit and link flow control messages will be described in connection with the flowchart depicted in FIG. 4. With reference to FIG. 4, the flow control circuit 33 will first establish and initialize a virtual circuit pointer (step 100) which will be used during the round-robin sequencing, in order of virtual circuit identifier, of virtual circuits from the set virtual circuit flow control state to the clear virtual circuit flow control state. Thereafter the flow control circuit 33 will determine if there are any virtual circuits which are in the set virtual circuit flow control state (step 101). If the flow control circuit 33 makes a negative determination in step 101, there are no virtual circuits which need to be sequenced from the set virtual circuit flow control state to the clear virtual circuit flow control state, it will return to step 101.

On the other hand, if the flow control circuit 33 makes a positive determination in step 101, there are virtual circuits which need to be sequenced from the set virtual circuit flow control state to the clear virtual circuit flow control state, and so it (that is, the flow control circuit 33) determines whether it is operating in the medium or heavy congestion state (step 102). While the flow control circuit 33 is operating in the heavy or medium congestion state, it will not sequence any virtual circuits from the set virtual circuit flow control state to the clear virtual circuit flow control state, and so if it (that is, the flow control circuit) makes a positive determination in step 102, it will return to step 101.

On the other hand if the flow control circuit 33 makes a negative determination in step 102, it is operating in either the non-flow controlled state or the normal congestion state, and so it can, on a round-robin basis, in order of virtual circuit identifier, sequence virtual circuits whose per-virtual circuit receive buffer occupancy level is below the selected per-virtual circuit receive buffer flow control threshold value, in the clear virtual circuit flow control state, enable the network transmit interface circuit 52 to transmit clear virtual circuit flow control messages therefor. Thus, if the flow control circuit 33 makes a negative determination in step 102, it will increment the virtual circuit pointer established in step 100 to point to the next virtual circuit that is in the set virtual circuit flow control state (step 103). Thereafter, the flow control circuit 33 will determine if it is operating in the non-flow controlled state (step 104), and, if so place the virtual circuit pointed to by the virtual circuit pointer in the clear virtual circuit flow control state (step 105) and enable the network transmit interface 42 to transmit a clear virtual circuit flow control message therefor (step 106). Thereafter, the flow control circuit 33 will return to step 101.

Returning to step 104, if the flow control circuit 33 determines in that step that it is not operating in the non-flow controlled state, it is operating in the normal congestion state. Accordingly, it will determine whether the virtual circuit pointed to by the virtual circuit pointer has a per-virtual circuit receive buffer occupancy level below the selected per-virtual circuit receive buffer occupancy level threshold (step 107). If the flow control circuit 33 makes a positive determination in that step 107, it will sequence to step 105 to place the virtual circuit pointed to by the virtual circuit pointer in the clear virtual circuit flow control state and thereafter enable the network transmit interface 42 to transmit a clear virtual circuit flow control message therefor (step 106). On the other hand, if the flow control circuit 33 makes a negative determination in step 107, the per-virtual circuit buffer occupancy level for the virtual circuit pointed to by the virtual circuit pointer is above the selected threshold, and so the flow control circuit 33 returns to step 101 without placing the virtual circuit in the clear virtual circuit flow control state.

Returning to FIG. 2, and in accordance with another aspect of the invention, as noted above, the receive scheduler 43 enables the network receive interface circuit 40 and processor 20 to communicate with the receive host 42 to control the scheduling of various operations performed by the receive host 42. The receive scheduler 43 provides for a number of tasks of a high priority class, including a "doorbell" task, a high-priority data transfer task and an end-of-message data transfer task, and one task of a low-priority class, namely, a low-priority data transfer task. In one embodiment, the processor 20 (FIG. 2) in connection with a particular virtual circuit, makes use of a "doorbell" mechanism to selectively notify the receive host 42 or the transmit host 50, through the system interface 32, when there is control information available for a particular virtual circuit. The doorbell mechanism selectively provides for each of the receive host 42 or the transmit host 50 work queues (not separately shown) in which the processor 20 loads pointers to control blocks (also not separately shown) for the respective virtual circuits stored in system memory 21. Each control block (which is referred to as a "descriptor" in the above-identified VIA specification) contains various types of commands and control information for the virtual circuit, including, for example, one or more pointers to respective buffers in system memory 21 in which data for messages received by the receive section 30 for the virtual circuit is to be stored, in connection with virtual circuits for which the network interface 24 is the destination, or one or more pointers to respective buffers in system memory 21 which contain data to be transmitted over the virtual circuit, in connection with virtual circuits for which the network interface 24 is the source. The processor 20 can enable the receive host 42 to perform a doorbell task in connection with a virtual circuit by loading a pointer to a control block in the work queue associated with the virtual circuit. During execution of a doorbell task in connection with a particular virtual circuit, the receive host 42 will retrieve and process command and control information from the control block pointed to by the first pointer in the work queue. The receive host 42 can also enable a doorbell task in connection with a virtual circuit if there is additional work to be done in connection with the current doorbell task. In addition, the receive host 42 can enable a doorbell task in connection with a virtual circuit if it has transferred data from the receive buffer 41 associated with a set end-of-message flag for the virtual circuit and if the work queue associated with the virtual circuit contains a pointer to a subsequent control block; this will enable the receive host 42 to, for example, obtain a pointer to another buffer in the system memory 21 in which it is to store data for the virtual circuit.

A high priority data transfer task in connection with a virtual circuit enables the receive host 42 to transfer data for the virtual circuit from the receive buffer 41 to the system memory 21 on a high-priority basis. Generally, the receive host 42 transfers data for a virtual circuit to the system memory 21 after a predetermined amount of data has accumulated in the receive buffer 41 for that virtual circuit. In one embodiment, the predetermined amount is selected so that, if the receive host 42 transfers data pursuant to the high-priority data transfer task, a block of data will be transferred in an efficient manner over the interconnection arrangement 25. A high priority data transfer task is generally enabled by the network receive interface 40, although it (that is, a high-priority data transfer task) can be enabled by the receive host 42 itself. The network receive interface 40 can enable a high-priority data transfer task in connection with a virtual circuit if, when it loads data from a cell into the linked list for the virtual circuit in the receive buffer 41, the amount of data in the linked list is at or above the predetermined threshold. In addition, the receive host 42 can enable a high-priority data transfer task in connection with a virtual circuit if, after performing any task for the virtual circuit, there is data in the linked list for the virtual circuit in the receive buffer 41.

An end-of-message data transfer task in connection with a virtual circuit enables the receive host 42 to transfer data for the virtual circuit from the receive buffer 41 to the system memory 21 on a high-priority basis, after a cell has been received for the virtual circuit indicating that it (that is, the cell) is the last cell for a message. The end-of-message data transfer task is provided to ensure that the data relating to an end of message is transferred to the system memory 21 on a high-priority basis, even if an insufficient amount of data has been accumulated in the receive buffer 41 for use of the high-priority data transfer task. The network receive interface 40 can enable an end-of-message data transfer task in connection with a virtual circuit if, when it loads data from a cell into the linked list for the virtual circuit in the receive buffer 41, the cell included a set end-of-message flag. In addition, the receive host 42 can enable an end-of-message data transfer task in connection with a virtual circuit if, after performing any task for the virtual circuit, a data for the virtual circuit buffered in the receive buffer 41 was from a cell which included a set end-of-message flag.

Finally, a low priority task in connection with a virtual circuit enables the receive host 42 to transfer data for the virtual circuit from the receive buffer 41 to the system memory 21 on a low-priority basis. If the receive host 42 has no high priority task to perform for any of the virtual circuits, it will perform a low-priority data transfer task to transfer data to the system memory 21 for a virtual circuit. It will be appreciated that, if the receive host 42 does not transfer data under the low-priority data transfer task for a virtual circuit for a while, a sufficient amount of data for the virtual circuit may accumulate in the receive buffer 41 to warrant the transfer using the high priority data transfer task. The network receive interface 40 can enable a low-priority data transfer task in connection with a virtual circuit when it loads data from a cell into the linked list for the virtual circuit in the receive buffer 41.

Generally, the receive scheduler 43 identifies for the receive host 42 of the particular virtual circuit, among those virtual circuits for which at least one task is enabled, for which it (that is, the receive host 42) is to perform a task. The receive scheduler 43 identifies virtual circuits for which tasks of the high-priority class are enabled on a round-robin basis, in order of virtual circuit identifier. If no task of the high-priority class is enabled for any of the virtual circuits, the receive scheduler 43 will identify virtual circuits, if any, for which tasks of the low-priority class are scheduled, also on a round-robin basis, in order of virtual circuit identifier. In any case, the receive scheduler 43 will provide the identification of a respective virtual circuit for which a task is to be performed to the receive host 42. The receive host 42, in turn, will determine which, if any, of the tasks of the high-priority class it is to perform for the identified virtual circuit based on the identified virtual circuit's current state, as maintained in the receive virtual circuit control circuit 44, and will perform that task. If the receive host 42 determines that no task of the high-priority class is to be performed for the virtual circuit, it will perform a task of the low-priority class. After the receive host 42 has performed at least one task for the identified virtual circuit, it will so notify the receive scheduler 43, and in addition can enable a subsequent task for that virtual circuit depending on the virtual circuit's then-current state (that is, the state of the virtual circuit after the task has been performed). After the receive scheduler 43 has received notification from the receive host 42 that it (that is, the receive host 42) has performed a task for the identified virtual circuit, it (that is, the receive scheduler 43) will identify the next virtual circuit, in order of virtual circuit identifier, for which a task is enabled, and these operations will be repeated therefor.

As noted above, the receive host 42, after receiving the identification of a virtual circuit for which a task is to be performed, determines the particular task to be performed from the current state of the identified virtual circuit. For example, if the receive host 42 determines that the receive buffer 41 contains data for the virtual circuit that is to be transferred, if it does not have a pointer to a buffer in system memory 21 in which the data is to be stored, it (that is, the receive host 42) will perform a doorbell task to retrieve a pointer. Thereafter, the receive host 42 can enable a doorbell task, or a high-priority data transfer task or an end-of-message data transfer task, depending on whether any data buffered for the virtual circuit is associated with a cell in which the end-of-message flag was set. On the other hand, if, the receive host 42, after receiving the identification of a virtual circuit for which a task is to be performed, has a pointer to a buffer in the system memory 21 in which the data is to be stored, it can initiate a transfer of up to a block of data to the system memory 21, through the system interface 32 and over the interconnection arrangement 25. Thereafter, the receive host 42 can, but need not, enable a doorbell task, or a high-priority data transfer task or an end-of message data transfer task depending on whether any data buffered for the virtual circuit is associated with a cell in which the end-of-message flag was set.

Figure 5:
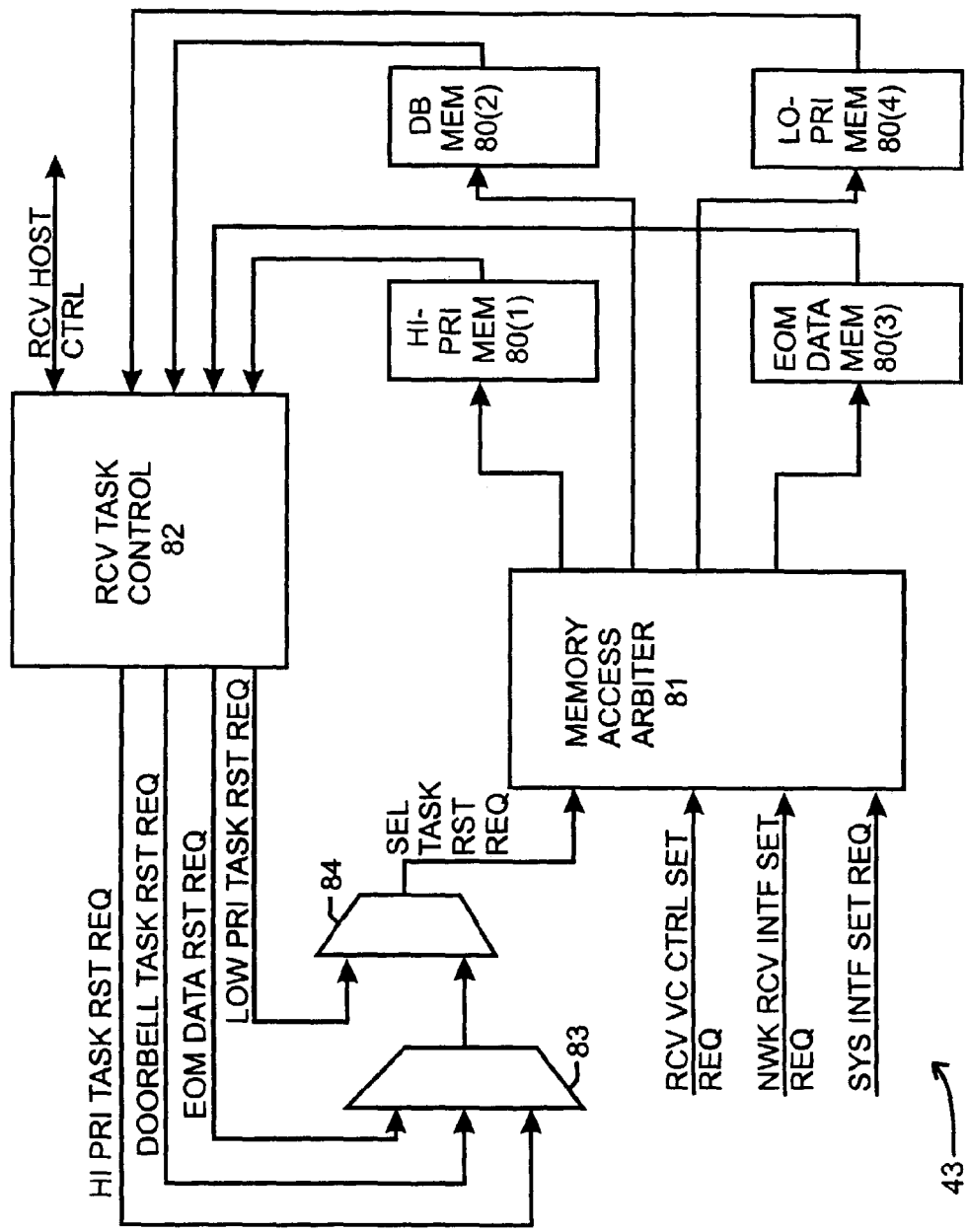
FIGS. 5 and 6 are functional block diagrams of receive and transmit schedulers for use in connection with the computer system depicted in FIG. 2.

FIG. 5 depicts a functional block diagram of receive scheduler 43 used in one embodiment of the invention. With reference to FIG. 5, the receive scheduler 43 includes a plurality of memories, including a high-priority data transfer memory 80(1), a doorbell memory 80(2), an end-of-message data memory 80(3) and a low-priority data transfer memory 80(4), a memory access arbiter 81, a task control 82, and plurality of multiplexers 83 and 84. Each of the memories 80(1) through 80(4) includes a series of bits, one bit for each virtual circuit for which the network interface 24 is destination. In one embodiment, in which a virtual circuit identifier may have ten bits, each memory 80(1) through 80(4) includes 1024 (that is, $2^{10}$) bits, each associated with one possible binary encoding of the virtual circuit identifiers, whether or not a virtual circuit has been established for a particular encoding. In that embodiment, bit (i) (index "i" ranging from zero to 1023) in each memory is associated with a virtual circuit having the identifier "i," whether or not a virtual circuit has been established for that identifier for which the network interface 24 is destination. When the "i-th" bit in a memory 80(1) through 80(4) is set, then the associated task (that is, a high-priority data transfer task, doorbell task, end-of-message data transfer task or a low-priority data transfer task) is enabled for the "i-th" virtual circuit.

The task control 82 receives signals representing the conditions of the bits from the memories and through appropriate ones of RCV_HOST_CTRL receive host control signals, identifies the appropriate one of the virtual circuits for which the receive host 42 is to perform a task. In addition, the task control 82 initiates the resetting of the bit associated with the identified virtual circuit in one of the memories 80(1) through 80(4). If the task control 82 identified the virtual circuit based on the fact that the virtual circuit's bit in one of the memories 80(1) through 80(3) is set, the task control 82 will enable the virtual circuit's bit in one of the memories 80(1) through 80(3) to be reset, the resetting being performed on a round-robin basis as among the memories 80(1) through 80(3). The task control 82 enables this operation by asserting the appropriate one of a HI_PRI_TASK_RST_REQ high priority task reset request signal, a DOORBELL_TASK_RST_REQ doorbell task reset request signal, or a LOW_PRI_TASK_RST_REQ low priority task reset request signal, which is coupled by a multiplexer 83 to one input of a multiplexer 84. The multiplexer 84, in turn, couples the signal as a SEL_TASK_RST_REQ selected task reset request signal to memory access arbiter 81. When the arbiter 81 selects the SEL_TASK_RST_REQ signal, the virtual circuit's bit of the appropriate one of the memories 80(1) through 80(3) will be reset.

On the other hand, if the task control 82 identified the virtual circuit based on the fact that the virtual circuit's bit in the memory 80(4) is set (which will be the case if the receive host 42 is to perform a low-priority data transfer task), the task control 82 will enable the virtual circuit's bit in the memory 80(4) to be reset. The task control 82 enables this operation by asserting A LOW_PRI_TASK_RST_REQ low priority task reset request signal, which, is coupled to one input of a multiplexer 84. The multiplexer 84, in turn, couples the signal as the SEL_TASK_RST_REQ selected task reset request signal to memory access arbiter 81. When the arbiter selects the SEL_TASK_RST_REQ signal, the virtual circuit's bit of the memory 80(4) will be reset.

Access to the memories to facilitate setting of the bits therein in response to a doorbell request from the processor 20 through the system interface 32, from the network receive interface 40 or the receive host 42 is also controlled by the memory access arbiter 81. The network receive interface 40, system interface 32 can issue respective NWK_RCV_INTF_REQ network receive interface, SYS_INTF_REQ system interface, and RCV_VC_CTRL_SET_REQ receive virtual circuit control set requests for a particular virtual circuit to the memory access arbiter 81 to set a bit in one of the memories 80(1) through 80(4) associated with the particular virtual circuit. When the memory access arbiter 81 selects the NWK_RCV_INTF_REQ, SYS_INTF_REQ or RCV_VC_CTRL_SET_REQ request, a bit in one of the memories 80(1) through 80(4) will be set for the particular virtual circuit. Generally, a bit in the doorbell memory 80(2) will be set in response to a SYS_INTF_REQ from the system interface 32, which, in turn, are in response to requests from the processor 20 enabling doorbell tasks. On the other hand, a bit in the high-priority data transfer memory 80(1), end-of-message data transfer memory 80(3) or data low-priority memory 80(4) will be set in response to a NWK_RCV_INTF_REQ request from the network receive interface 40, generally after the network receive interface 40 has loaded data from one or more cells associated with a particular virtual circuit in the receive buffer 41. In addition, a bit in any of the memories 80(1) through 80(3) may be set in response to a RCV_VC_CTRL_SET_REQ request from the receive host 42 to enable a high-priority data transfer task, a doorbell task or an end-of-message data transfer task, respectively.

It will be appreciated that, by providing that the receive scheduler 43 enables tasks to be performed in connection with virtual circuits on a round-robin basis, in order of virtual circuit identifier, the receive scheduler 43 provides for a measure of fairness as among the respective virtual circuits. In addition, tasks are enabled to be performed in a manner so as to provide for a reasonable use of the various resources provided by the network interface 24. For example, the receive scheduler 43 will not normally enable the receive host 42 to transfer data to the system memory 21 associated with a particular virtual circuit unless a predetermined minimum amount of data has been received to be transferred, to make efficient use of the interconnection arrangement 25 (this in connection with the low-priority transfer task). However, if the receive buffer 41 is buffering at least the predetermined minimum amount of data, the receive scheduler 43 will enable data associated with the virtual circuit to be transferred to the system memory 21 (this in connection with the high-priority transfer task). In addition, if the receive buffer 41 is buffering data associated with the end of a message transfer over a virtual circuit, the receive scheduler 43 will enable data associated with that virtual circuit to be transferred to the system memory 21 (this also in connection with the high-priority transfer task) since there may be no further data received for that virtual circuit, or there may be a relatively long delay until subsequent data is received for that virtual circuit. Finally, if there are no other tasks for the receive host 42 to perform, the receive scheduler 43 enables the receive host 42 to perform a low-priority transfer.

As further noted above, the transmit scheduler 53 enables the transmit host 50 to communicate with the system interface 32 and the network transmit interface circuit 52 to control the scheduling of the above-described operations performed by the network transmit interface circuit 52. The transmit scheduler 53 also enables the processor 20 to communicate with the transmit host 50 to control certain operations by the transmit host 50 under control of the application programs being processed by the computer 12(m), to, for example, notify the transmit host 50 of particular locations in the system memory 21 in which data to be transmitted in cells associated with respective virtual circuits is stored.

Generally, the transmit scheduler 53 controls the retrieval of data by the transmit host 50 to be buffered in the transmit buffer 51 for subsequent transmission by the network transmit interface 52. In addition, as noted above, in one embodiment, the processor 20 (FIG. 2) in connection with a particular virtual circuit, makes use of a "doorbell" mechanism to selectively notify the receive host 42 or the transmit host 50 when there is control information available for a particular virtual circuit, thereby to selectively enable the transmit host 50 to retrieve information for the virtual circuit from a control block (not separately shown) for the virtual circuit in system memory 21. During execution of a doorbell task in connection with a particular virtual circuit, the transmit host 50 will retrieve and process command and control information from the virtual circuit's control block in a manner similar to that described above in connection with the receive host 42. In order of priority, the transmit scheduler 53 enables the transmit host 50 to:

(i) on a highest priority basis, process a doorbell task in connection with a predetermined maximum number of virtual circuits, the processing being performed on a round-robin basis, in order of virtual circuit identifier, for the virtual circuits for which doorbell tasks are to be performed;

(ii) on an intermediate priority basis, selectively retrieve data from the system memory 21 for storage in the transmit buffer 51, the retrieval being performed on a round-robin basis, in order of virtual circuit identifier, for the virtual circuits which are not in set virtual circuit flow control mode or for which transmission is not otherwise limited, also in connection with a predetermined maximum number of virtual circuits, and (iii) on a lowest priority basis, selectively retrieve data from the system memory 21 for storage in the transmit buffer 51, the retrieval being performed on a round-robin basis, in order of virtual circuit identifier, for the virtual circuits for which transmission is limited and which are in a not in set virtual circuit flow control mode.

With respect to item (iii) above, the virtual circuits for which transmission is limited includes the virtual circuits for which transmission is limited to a particular transmission rate. As with the receive scheduler 43, since the transmit scheduler 53 operates on a round-robin basis, in order of virtual circuit identifier, in connection with virtual circuits within a particular priority level, the transmit scheduler 54 provides for a measure of fairness as among the respective virtual circuits for which operations are to be performed at that priority level. In addition, since the transmit scheduler 53, after performing operations in connection with a predetermined maximum number of virtual circuits within the priority level, will proceed to the next lower priority level, the transmit scheduler 53 provides a degree of fairness as among virtual circuits at the different priority levels.

Figure 6:
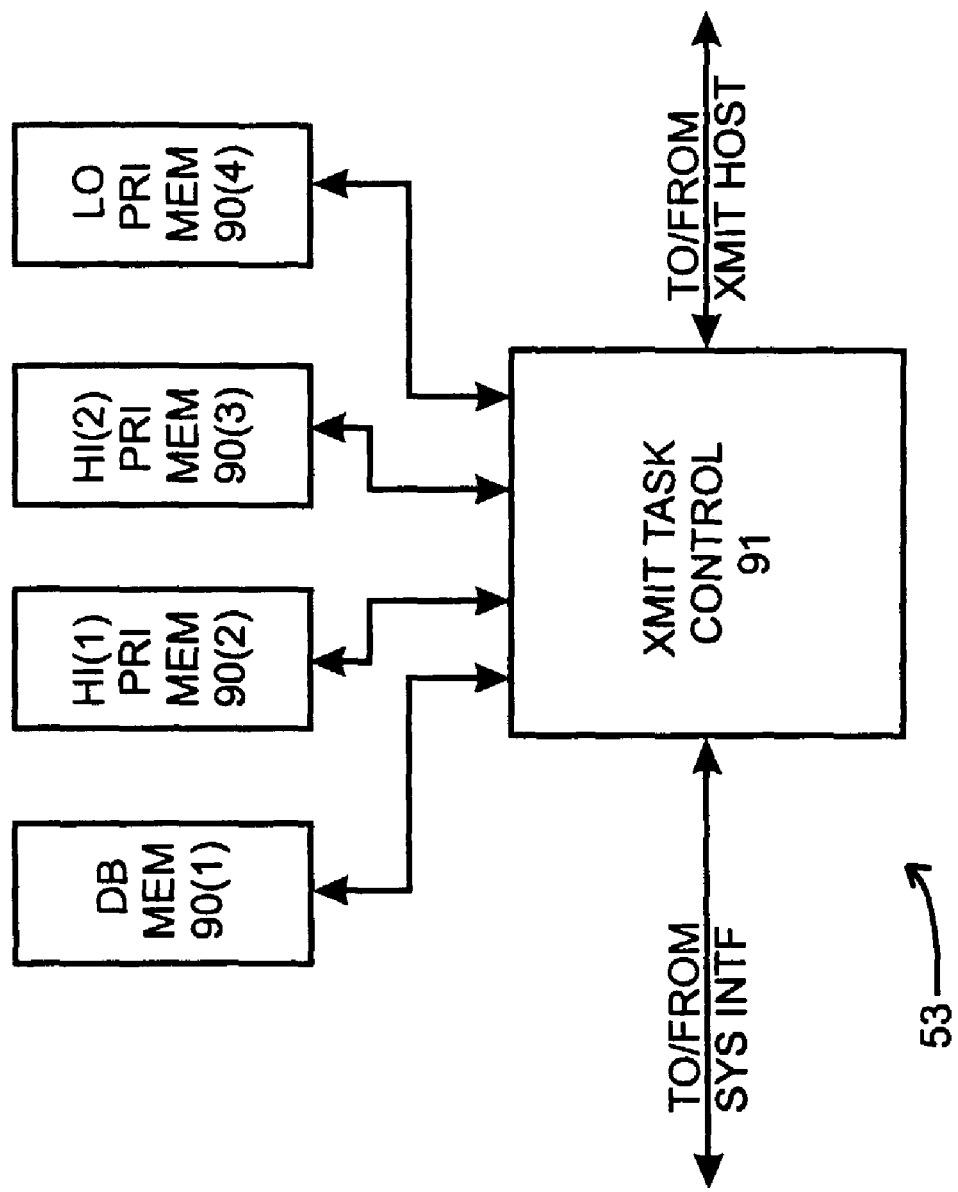

A functional block diagram of transmit scheduler 53 is depicted in FIG. 6. With reference to FIG. 6, the transmit scheduler 53 includes a doorbell memory 90(1), two high-priority memories 90(2) and 90(3), a low-priority memory 90(4), and a transmit task control 91. Each of the memories stores the identification of the virtual circuits for which a respective task is to be performed, which identification the transmit task control 91 uses to enable the transmit host 50 in performing the respective tasks. Each of the memories 90(1) through 90(4) includes a series of bits, one bit for each virtual circuit for which the network interface 24 is source. In one embodiment, in which a virtual circuit identifier may have ten bits, each memory 90(1) through 90(4) includes 1024 (that is, $2^{10}$) bits, each associated with one possible binary encoding of the virtual circuit identifiers, whether or not a virtual circuit has been established for a particular encoding. In that embodiment, bit (i) (index "i" ranging from zero to 1023) in each memory is associated with a virtual circuit having the identifier "i," whether or not a virtual circuit has been established for that identifier for which the network interface 24 is source.

The doorbell memory 90(1) stores the identifications of virtual circuits for which doorbell tasks are to be processed. As with doorbell memory 80(1) in the receive scheduler 43, the bit of the doorbell memory 90(1) in the transmit scheduler 53 associated with a virtual circuit is set in response to a request therefor from the processor 20, thereby to enable a doorbell task to be performed by the transmit section 31. When the transmit host 50 is to begin retrieving data for a new message for transmission over a virtual circuit, the transmit task control 91 will set the bit associated with the virtual circuit in the high-priority memory 90(2). If a message to be transmitted is relatively long, after the transmit host 50 has retrieved some portion of the data for the message, the transmit task control 91 will reset the bit associated with the virtual circuit in the high-priority memory 90(2) and set the bit associated with the virtual circuit in the high-priority memory 90(3). When the transmit host 50 is to retrieve data for a virtual circuit that is transmission rate limited, the transmit task control 91 will set the bit associated with the virtual circuit in the low-priority memory 90(4).

The transmit task control 91 uses the bits in the respective memories 90(1) through 90(4) to identify the respective virtual circuits for which a doorbell or data retrieval operation is to be performed, on a round-robin basis, in order of virtual circuit identifier, within each memory. If one or more bits are set in the doorbell memory 90(1), indicating that the processor 20 has enabled a doorbell task to be performed in connection with respective virtual circuits, the transmit task control 91, in cooperation with the transmit host 50 and system interface 32, will retrieve the information from the virtual circuit's control block and process the doorbell task. If a message is to be transmitted over the virtual circuit, the bit associated with the virtual circuit will be set in the high-priority memory 90(2) if the virtual circuit is not transmission rate limited, or in the low-priority memory 90(4) if the virtual circuit is transmission rate limited. These operations will be repeated for the virtual circuits for which the respective bits in the doorbell memory 90(1) are set on a round robin basis, in order of virtual circuit identifier.

After a series of doorbell tasks have been processed for a predetermined number of virtual circuits using doorbell memory 90(1), if any of the bits in the memories 90(2) through 90(4) are set, indicating that data is to be retrieved from the system memory 21 for transmission for at least one virtual circuit, the transmit task control 91 will enable the transmit host 50 to begin such operations. Generally, in those operations, the transmit task control 91 enables the transmit host 50 to, in a series of iterations, retrieve data for transmission over a predetermined number of virtual circuits identified in one of the high-priority memories 90(2) or 90(3), and thereafter retrieve data for transmission over a predetermined number of virtual circuits identified in the low-priority memory 90(4), with the particular memory 90(2) and 90(3) alternating as between iterations. The transmit task control 91 will enable the transmit host 50 to perform one such iteration after each series of doorbell tasks. In connection with retrievals performed using each memory 90(2) through 90(4), retrievals are performed on a round-robin basis, in order of virtual circuit identifier, for the virtual circuits using the successive bits in each memory.

It will be appreciated that the transmit scheduler 53, as described above, identifies the particular virtual circuit for which data is to be retrieved, and the transmit host 50 actually performs the data retrieval operation. Generally, in the data retrieval operation, if the virtual circuit is in the set virtual circuit flow control mode, as described above, the transmit host 50 will not retrieve any data for the virtual circuit. Similarly, if either (i) the transmit buffer 51 already contains data associated with a predetermined number of complete cells associated with the virtual circuit, or (ii) the transmit buffer 51 contains more than a predetermined amount of data, the transmit host 50 will not retrieve any data for the virtual circuit, unless, with respect to (ii), at least some data is associated with one or more incomplete cells, in which case the transmit host 50 will retrieve only sufficient data to complete the cell(s). Otherwise, the transmit host 50 will retrieve a block of data from the system memory 21, the size of which is preferably a multiple of the amount of data in a cell, less the amount of data for any partial cell(s) already buffered in the transmit buffer 51, with the size of the block being selected to provide efficient transfer over the interconnection arrangement 25.

By using the two memories 90(2) and 90(3) to identify non-rate-limited virtual circuits for which data is to be retrieved for transmission, and for alternating between them in successive iterations, the transmit scheduler 53, and by having the transmit host 50 retrieve blocks of data as described above, it will be appreciated that cells associated with relatively short messages will be transmitted with reasonable latency. This follows from the fact that, during at least alternating iterations, memory 90(2) is used to identify virtual circuits for which data its to be retrieved by the transmit host 50. As noted above, the memory 90(2) identifies the virtual circuits for which data for at least the beginning of messages is to be retrieved by the transmit host 50. If a virtual circuit's message is relatively short, then the transmit host 50 may retrieve all of the data for the message during the iteration in which the bit for the virtual circuit is set in the memory 90(2), and so the message will not be delayed by relatively long messages associated with other virtual circuits. However, if the amount of data for the message is sufficiently large that it (that is, the data) cannot be retrieved during the iteration, then the bit associated with the virtual circuit in the memory 90(2) will be reset, but the bit associated with the virtual circuit in the memory 90(3) will be set, in which case more data associated with the virtual circuit may be retrieved when the virtual circuit is serviced in accordance with the round-robin activity, in order of virtual circuit identifier, with the virtual circuits whose bits are set in that memory 90(3).

FIG. 3 depicts a functional block diagram of a switching node 11(n) useful in the network 10 depicted in FIG. 1. With reference to FIG. 3, the switching node 11(n) comprises a plurality of input ports 60(1) through 60(I) (generally identified by reference numeral 60(i)), a plurality of output ports 61(1) through 61(I) (generally identified by reference numeral 61(i)) a buffer store 63 and a buffer manager 64. Each input port 60(i) is connected to receive cells, identified by "CELLS IN," from a computer 12(m) or a switching node over a communications link 13(p). Each output port 61(i) is connected to transmit cells, identified by "CELLS OUT," to a computer 12(m) or a switching node over the same communication link 13(p). If input port 60(i) receives cells from, and output port 61(i) transmits cells to, a switching node, the switching node from which the input port 60(i) of switching node 11(n) receives cells, or to which the output port 61(i) of switching node 11(n) transmits cells, is preferably another switching node 11(n') (n'≠n), but may be the same switching node 11(n) if the communication link 13(p) forms a loopback connection for the switching node 11(n).

Each input port 60(i), when it receives a cell over the communication link 13(p) connected thereto, buffers the cell in the buffer store 63. Each input port 60(i) includes a cell receiver 70, which actually receives and buffers cells prior to its being transferred to the buffer store 63 for buffering, and an input port control 71 that includes the virtual circuit information for the virtual circuits over which the input port 60(i) receives cells. In one embodiment, the cell receiver 70 provides an internal "double buffer" arrangement (not separately shown) for received cells, in particular providing one internal buffer which can accommodate at least a portion of a just-received cell prior to being transferred to the buffer store 63, while portions of another cell is being received in another of the internal buffers.

After the cell receiver 70 has received a cell, the input port control 71 transfers the cell to the buffer store 63 for buffered storage. Generally, the buffer store 63 comprises a plurality of "B" buffers BUF(0) through BUF(B-1) (generally identified by (BUF(b)), which are organized in linked lists by buffer link headers 75 in the buffer manager 64. Each of the buffers BUF(B) can store information from one cell. Generally, the buffer store 63 and buffer manager 64 provide one linked list for each virtual circuit through the switching node 11(n), and in addition provides a free list. The buffer link headers 75, in turn, includes a plurality of buffer headers BUF_HDR(0) through BUF_HDR(B-1) (generally identified by BUF_HDR(b)), each of which is associated with the correspondingly-indexed buffer BUF(b) in the buffer store 63. The input port control 71 of each input port 61(i) maintains a virtual circuit information block (not separately shown) in which it stores, inter alia, a linked list header including a head pointer and a tail pointer and a buffer count value, for each virtual circuit for which the input port 61(i) forms a path. In addition, the buffer manager 64 maintains a free list header including a head pointer and a tail pointer for the free list. For each linked list, (i) the head pointer points to
  (a) in the case of a linked list for a virtual circuit, the buffer header BUF_HDR(b') associated with the buffer BUF(b') which contains information for the last cell buffered in the buffer store 63 for the virtual circuit, or
  (b) in the case of the free list, the buffer header BUF_HDR (b) associated with the first buffer BUF(b) in the free list,
(ii) the tail pointer points to
  (a) in the case of a linked list for a virtual circuit, the buffer header BUF_HDR(b') associated with the buffer BUF(b') which contains information for the last cell buffered in the buffer store 63 for he virtual circuit, or
  (b) in the case of the free list, the buffer header BUF_HDR (b') associated with the last buffer in the free list, and
(iii) the buffer count value identifies, in the case of a linked list for a virtual circuit, the number of buffers in the buffer store 63 linked into the linked list.

It will be appreciated that the buffer BUF(B) pointed to by the head pointer may, but need not, be the same buffer BUF(b') pointed to by the tail pointer; if the buffer BUF(B) pointed to by the head pointer is the same buffer BUF(b') pointed to by the tail pointer, there will be one buffer BUF(b) associated with the linked list in the buffer store 63. In addition, each buffer header BUF_HDR(b), except for the last buffer header in the linked list, includes a next pointer that points to the next buffer header BUF_HDR(b") in the linked list; the next pointer in the last buffer header in the linked list may point to the list header for the linked list, or it may contain a value that identifies it as the last buffer header in the linked list. In the case of a linked list associated with a virtual circuit, the buffer BUF(b") will store information for the next cell received by the switching node 11(n) following the cell whose information is stored in buffer BUF(b) for the same virtual circuit.

Generally, in storing a cell in buffer store 63, the input port control 71 will store the cell in the buffer BUF(b) associated with the buffer header BUF_HDR(b) that is at the head of the free list, and will update the header pointer and buffer count of the free list's list header accordingly. In addition, the input port control 71 will (i) if the buffer count value in the virtual circuit information block for the virtual circuit is non-zero, indicating that there is an active linked list in the buffer store 63 and buffer manager 64 for the virtual circuit, update the next pointer of the buffer header pointed to by the tail pointer that it maintains in the virtual circuit information block for the virtual circuit, (ii) load a value into the next pointer of the buffer header BUF_HDR(b) associated with buffer BUF(B) in which the cell is being stored to indicate that it is the last buffer header in the linked list, and (iii) update the linked list header, including the head and tail pointer as necessary and the cell count value, that it maintains in the virtual circuit information block associated with the virtual circuit.

The virtual circuit information block maintained by the input port control 71 for each virtual circuit also identifies the particular output port 61(i') over which cells associated with the virtual circuit are to be transmitted, and the input port control 71 will, after establishing the linked list, also notify the output port 61(i') that a cell has been received for the virtual circuit to be transmitted by that output port 61(i').

Each output port 61(i), when it receives notification from the input port control 71 of an input port 60(i) that at least one cell is being buffered in buffer store 63 for a virtual circuit over which it (that is, the output port 61(i')) is to transmit cells, will, if the communication link 13(p) to which it is connected is in the clear link flow control state, initiate operations to retrieve cells associated with the virtual circuit from the buffer store 63 and transmit them over the communication link 13(p) connected thereto. It will be appreciated that, if the communication link 13(p) to which the output port 61(i) is connected is in the set link flow control state, the output port 61(i) will be disabled from transmitting any cells associated with any virtual circuit thereover.

Each output port 61(i) includes an output port control 72 and a cell transmitter 73. The output port control 72 receives the notifications from the input port control 71 of a respective input port 60(i). In response, unless the communication link 13(p) is in the set link flow control state, output port control 72 will access the virtual circuit information block for the virtual circuit as maintained by the input port control 71 to identify the head pointer for the linked list thereby to identify the first cell in the linked list associated with the virtual circuit, enable the cell to be retrieved from the buffer store 63 and transferred to the cell transmitter 73 for processing and transmission. As is conventional, the header portion of the cell may need to be updated prior to transmission, which will be performed by the cell transmitter 73. As with the cell receiver 70, in one embodiment, the cell transmitter 73 provides an internal "double buffer" arrangement (not separately shown) for cells to be transmitted, in particular providing one internal buffer which can accommodate a portion of a cell being retrieved from the buffer store 63, while a portion of another cell is being transmitted over the communication link 13(p) connected thereto. After a cell has been retrieved for transmission, the output port control 72 can enable the input port control 71 to decrement the cell count value maintained in the virtual circuit information block for the virtual circuit to reflect retrieval of the cell. If the cell count value in the virtual circuit information block is not zero after being decremented, the input port control 71 notifies the output port control 72 that the linked list for the virtual circuit is still active. In addition, the input port control 71 updates the header pointer in the virtual circuit information block to point to the next cell in the linked list. The output port control 72 initiates retrievals of cells for all of the virtual circuits transmitted therethrough on a round-robin basis, in order of virtual circuit identifier, as long as there are cells for the respective virtual circuits buffered in the buffer store 63.

As will be appreciated, an input port 60(i) may receive messages other than cells, in particular, the input port 60(i) may receive set and clear virtual circuit flow control messages and set and clear link flow control messages. If an input port 60(i) receives a set virtual circuit flow control message, the switching node 11(n) will enter a set downstream virtual circuit flow control state for the virtual circuit, and in that case the input port control 71 associated with the input port 60(i) will set a downstream virtual circuit flow control state flag (not separately shown) in the virtual circuit information block maintained for the virtual circuit, and in addition will enable the appropriate output port 61(i") which is connected to the upstream switching node 11(n") along the path of the virtual circuit toward the source computer 12($m_S$), or the source computer 12($m$S) for the virtual circuit to transmit the set virtual circuit flow control message over the communication link 13(p).

As noted above, the switching node 11(n) can also enter a set virtual circuit flow control state and generate a set virtual circuit flow control message and transmit it upstream along the path for the virtual circuit when it determines that cells associated with a virtual circuit are being received at too fast a rate to be transmitted downstream along the virtual circuit. In that connection, the input port control 71 associated with the input port 60(i) which maintains the virtual circuit information block for the virtual circuit also maintains a local virtual circuit flow control flag, which the input port control 71 can set to place the virtual circuit in a set local virtual circuit flow control state. When the input port control 71 sets the local virtual circuit flow control flag, it also enables the output port 60(i") connected to the upstream switching node 11(n") or the source computer 12($m_S$) for the virtual circuit to transmit a set virtual circuit flow control message over the communication link 13(p). After the output port 61(i') connected to the downstream switching node along the path associated with the virtual circuit or the destination computer 12($m_D$) associated with the virtual circuit, has retrieved a sufficient number of cells associated with the virtual circuit buffered by buffer store 63, it can clear the local virtual circuit flow control flag to place the virtual circuit in a clear local virtual circuit flow control state.

The downstream virtual circuit flow control flag and local virtual circuit flow control flag associated with each virtual circuit are also used to control the transmission or generation of clear virtual circuit flow control messages for the virtual circuit by the switching node 11(n). In that connection, if (i) the input port 60(i) receives a clear virtual circuit flow control message associated with a virtual circuit, it can clear the downstream virtual circuit flow control flag, thereby to place the virtual circuit in a clear downstream virtual circuit flow control state, and, if the virtual circuit is not also in the set local virtual circuit flow control state, the input port 60(i) can enable the output port 60(i") connected to the upstream switching node along the path associated with the virtual circuit, or the source computer $12(m_S)$ associated with the virtual circuit, to generate and transmit a clear virtual circuit flow control message; and (ii) the output port $61(i')$ connected to the downstream switching node along the path associated with the virtual circuit, or the source computer $12(m_S)$ associated with the virtual circuit, clears the local virtual circuit flow control flag, thereby to place the virtual circuit in the clear local virtual circuit flow control state, and if the virtual circuit is not also in the set downstream virtual circuit flow control state, the output port $61(i')$ can enable the output port $60(i'')$ connected to the upstream switching node along the path associated with the virtual circuit, or the source computer $12(m_S)$ associated with the virtual circuit, to generate and transmit a clear virtual circuit flow control message.

In connection with the invention, the input port control 71 and output port control 72 also perform several operations in connection with determination of whether a particular virtual circuit is to be placed in the set and clear local virtual circuit flow control state, and also in connection with placement of a particular communication link $13(p)$ in the set or clear link flow control state. In connection initially with the local virtual circuit flow control state, the determination as to whether to set or clear the local virtual circuit flow control state for a virtual circuit is based on:

(i) an output port virtual circuit utilization number for the output port $61(i')$ which is connected to the downstream switching node along the path associated with the virtual circuit or the destination computer $12(m_D)$ associated with the virtual circuit;

(ii) the cell occupancy level of the buffer store 63; and (iii) the number of cells associated with the virtual circuit that are buffered in the buffer store 63.

The output port virtual circuit utilization number for an output port $61(i')$ identifies the number of virtual circuits for which buffer store 63 is storing cells to be transmitted by the output port $61(i')$. Since, as described above, the output port $61(i)$ retrieves cells for virtual circuits on a round-robin basis, in order of virtual circuit identifier, as the output port virtual circuit utilization number for a particular output port $61(i')$ increases the time between retrievals for a particular virtual circuit will increase, and so undesirable congestion can develop if the cell occupancy level of the buffer store 63 (item (ii)) increases and the number of cells associated with a particular virtual circuit (item (iii)) also increases.

In one embodiment, the output port control 72 defines three output port virtual circuit utilization levels (reference item (i) above), namely, a low utilization level, a normal utilization level and a heavy utilization level, for each output port $61(i)$. If the number of virtual circuits for which the buffer store 63 is storing cells to be transmitted by the output port $61(i)$ is (a) below a selected low output port utilization threshold, the output port control 72 determines that the output port $61(i)$ is in the low utilization level;

(b) between the selected low output port utilization threshold and a selected higher output port utilization threshold, output port control 72 determines that the output port $61(i)$ is in the normal utilization level; and (c) above the higher output port utilization threshold, the output port control 72 determines that the output port $61(i)$ is in the heavy utilization level.

In addition, the output port control 72 defines one buffer occupancy threshold (reference item (ii) above), and three sets of buffered cell "watermark" levels (reference item (iii) above). Each set of buffered cell watermark levels identifies a number of cells associated with the virtual circuit buffered in the buffer store 63 at which the virtual circuit is to be placed in the set local virtual circuit flow control state, and a number of buffered cells at which the virtual circuit is to be placed in the clear local virtual circuit flow control state. The sets of buffered cell watermark levels include a low buffered cell watermark level, an intermediate buffered cell watermark level and a high buffered cell watermark level, which define successively higher numbers for both the number of buffered cells associated with the virtual circuit at which the virtual circuit is to be placed in the set local virtual circuit flow control state, and at which the virtual circuit is to be placed in the clear local virtual circuit flow control state.

The input port control 71 uses the output port virtual circuit utilization level and the buffer occupancy level to select one of the sets of the buffered cell watermark levels which will be used to determine whether a virtual circuit is to be placed in the set or clear virtual circuit flow control state. In that connection, if the output port control 72 determines that the cell occupancy level of the buffer store 63 is below the buffer occupancy threshold, for each virtual circuit, (i) if the virtual circuit utilization level associated with the output port $61(i')$ that retrieves cells associated with the virtual circuit for transmission is in the low utilization level, it (that is, the input port control 71) will select the high buffered cell watermark level set, (ii) if the virtual circuit utilization level associated with the output port $61(i')$ that retrieves cells associated with the virtual circuit for transmission is in the medium utilization level, it (that is, the input port control 71) will select the intermediate buffered cell watermark level set, and (iii) if the virtual circuit utilization level associated with the output port $61(i')$ that retrieves cells associated with the virtual circuit for transmission is in the high utilization level, it (that is, the input port control 71) will select the low buffered cell watermark level set.

On the other hand, if the input port control 71 determines that the cell occupancy level of the buffer store 63 is at or above the buffer occupancy threshold, for each virtual circuit, (iv) if the virtual circuit utilization level associated with the output port $61(i')$ that retrieves cells associated with the virtual circuit for transmission is in the low utilization level, it (that is, the input port control 71) will select the intermediate buffered cell watermark level set, (v) if the virtual circuit utilization level associated with the output port $61(i')$ that retrieves cells associated with the virtual circuit for transmission is in the medium utilization level, it (that is, the input port control 71) will select the low buffered cell watermark level set, and (vi) if the virtual circuit utilization level associated with the output port $61(i')$ that retrieves cells associated with the virtual circuit for transmission is in the high utilization level, it (that is, the input port control 71) will also select the low buffered cell watermark level set.

It will be appreciated that, in either so that, with increasing virtual circuit utilization levels, lower numbers of buffered cells associated with the virtual circuit are required to enable the virtual circuit to be placed in the set local virtual circuit flow control state. However, if the buffer occupancy level of buffer store 63 increases above the buffer occupancy threshold, buffered cell watermark levels are selected which will require fewer numbers of buffered cells associated with a virtual circuit to place the virtual circuit in the set local virtual circuit flow control state. The input port control 71 uses the watermark levels in the buffered cell watermark level set selected for each virtual circuit in determining whether to set or clear the local virtual circuit flow control flag to place the virtual circuit in the set or clear local virtual circuit flow control state.

In one embodiment, within each buffered cell watermark level set, the buffered cell watermark level that identifies the number of cells buffered in buffer store 63 at which the virtual circuit is to be placed in the clear local virtual circuit flow control state is less than the buffered cell watermark level that identifies the number of cells buffered in buffer store 63 at which the virtual circuit is to be placed in the set local virtual circuit flow control state. This will provide a degree of "hysteresis" that will ensure that the local virtual circuit flow control state associated with a particular virtual circuit does not effectively rapidly toggle between the set and clear state if cells are received and transmitted by the switching node 11(n) when the number of cells buffered in buffer store 63 associated with a particular virtual circuit is proximate the appropriate watermark level.

In addition, the input port control 71 determines when the switching node 11(n) or a particular communication link 13(p) connected thereto is to go into a set or clear link flow control state and regulates transmission of link flow control messages by the output ports 61(i) in response thereto. Generally, the input port control 71 of input port 60(i) will (i) place a communication link 13(p) connected to the switching node 11(n) in the set link flow control state if the cell occupancy level of buffer store 63 increases to a level above a selected set link flow control threshold level, in which case the input port control 71 will enable the correspondingly-indexed output port 61(i) to transmit set link flow control messages; and thereafter (ii) place the switching node 11(n) in the clear link flow control state, (a) if the cell occupancy level of buffer store 63 decreases to a level below a selected clear link flow control threshold level, place the communication link 13(p) in the clear link flow control state, in which case the input port control 71 will enable the correspondingly-indexed output port 61(i) to transmit clear link flow control messages to the switching node 11(n) or computer 12(m) connected thereto; or (b) the number of cells buffered in buffer store 63 that are associated with virtual circuits that are received through a respective input port 60(i) is equal to or below a predetermined per-input port threshold level, place the communication link 13(p) connected to that input port 60(i) in the clear link flow control state, in which case the input port control 71 of input port 60(i) will enable the correspondingly-indexed output port 61(i) to transmit a clear link flow control message to the switching node 11(n) or computer 12(m) connected thereto; in one embodiment, the per-input port threshold level is selected to be zero.

In one embodiment, the set link flow control threshold level is greater than the clear link flow control threshold level. This will provide a degree of "hysteresis" that will ensure that the link flow control state does not effectively rapidly toggle between the set and clear state if cells are received and transmitted by the switching node 11(n) when the number of cells buffered in buffer store 63 is proximate the set link flow control threshold level.

In addition to the buffer link headers 75, the buffer manager also includes an arbiter 76 that schedules access to the buffer store 63, to the buffer link headers 75 maintained by buffer manager 64, and to the virtual circuit information block maintained by the input port control 71 of each of the output ports 61(i), by the input port control 71 and output port control 72. Generally, (i) the input port control 71 of an input port 60(i), when it receives a cell associated with a virtual circuit, will need to access (a) the linked list information maintained by the buffer manager 64 for the free list to identify a buffer BUF(b) in the buffer store 63 in which it is to store the cell, and to update the linked list information for the free list, (b) the buffer store 63 to store the received cell in the identified buffer, (c) the virtual circuit information block maintained by the input port control 71 in order to retrieve the linked list information therein and to update the linked list information, the cell count value and the flow control status for the virtual circuit, and in addition to identify the output port 61(i) through which the cell is to be transmitted, and (d) the linked list information maintained by the buffer manager for the linked list associated with the virtual circuit, as identified by the linked list information in the virtual circuit information block maintained by the input port control 71, to link the buffer in which the received cell was stored to the linked list for the flow control, and (ii) the output port control 72 of an output port 61(i), when it is to transmit a cell associated with a virtual circuit, will need to access:

(a) the virtual circuit information block maintained by the input port control 71 through which the cell was received, in order to retrieve the linked list information and to update the information therein, including the linked list information and the cell count value, and also to update the flow control status for the virtual circuit as appropriate, (b) the buffer store 63 to retrieve the cell for transmission from the buffer, and (c) the linked list information maintained by the buffer manager to de-link the buffer in which the cell to be transmitted from the linked list for the virtual circuit, and to link the buffer to the free list.

Generally, the arbiter 76 arbitrates among access requests by the input port controls 71 of the input ports 60(i) and the output port controls 72 of the input ports 61(i) as described above. In that operation, in one embodiment, the arbiter 76 generally provides that the input port controls 71 will have the higher priority, on a round-robin basis as among themselves, with the output port controls 72 having the lower priority, on a round-robin basis as among themselves.

The invention provides a number of advantages. As noted above, the invention provides an arrangement that provides for the efficient transfer of messages between computers and other devices over a network, while avoiding cell loss which may arise from congestion in the network. Since transmission of data by the transmit section 31 of the network interface 24 is performed on a round-robin basis, in order of virtual circuit identifier, as among the virtual circuits for which the computer 12(m) is the source, the invention provides a significant degree of fairness as among virtual circuits extending therefrom, effectively guaranteeing at least some message transfer bandwidth to all of the virtual circuits and bounding message transfer latency thereamong, thereby providing for deterministic message transfer latency characteristics. Fairness as among virtual circuits is further enhanced by providing that the switching nodes transfer data from cells received thereby for virtual circuits on a round-robin basis, in order of virtual circuit identifier, and that, for each destination computer, the receive section 30 of the network interface 24 transfers to the system memory 21 the data from cells received thereby over virtual circuits for which the computer 12(m) is the destination on a round-robin basis, in order of virtual circuit identifier, thereby reducing the likelihood that the receive buffer 41 will become overloaded with data from any one virtual circuit. The invention facilitates a reduction in system cost, since a smaller amount of memory can be used in the switching node 11(n), particularly in the buffer store 63, and achieve desirable message transfer saturation characteristics.

As noted above, the invention further avoids cell loss that may arise from congestion in the network, by providing efficient mechanisms for "end-to-end" virtual circuit and link flow control. In connection with the virtual circuit flow control, the invention provides an efficient mechanism for controlling transmission of cells over virtual circuits between respective destination and source computers 12(m) based on the instantaneous capacity of the switching nodes 11 which form the path for virtual circuit to forward cells for the virtual circuit and the destination computer to receive cells over the virtual circuit. In addition, in connection with the link flow control, the invention provides a separate mechanism for controlling transmission of cells over each communication link based on the instantaneous capacity of the device receiving cells over the respective link to receive cells over the respective link. The virtual circuit flow control further enhances fairness as among virtual circuits, since threshold levels at which virtual circuit flow control is implemented are selected so as to ensure that transfer rates over particular ones of the virtual circuits do not become so large as to undesirably reduce bandwidth available for other virtual circuits for which cells are to be transferred.

It will be appreciated that a number of modifications may be made to the system 10, computers 12(m) and switching nodes 11(n) as described above. For example, it will be appreciated that a system 10 in connection with the invention may be constructed by interconnecting a plurality of computers 12(m) without the need of switching nodes 11(n), for example, by interconnecting the network interfaces 24 of two computers 12(m), and allowing them to establish virtual circuits for transferring data therebetween. In addition, it will be appreciated that other types of components, such as gateways, bridges, and the like, may be provided for connecting the network 10 to other networks, and other types of devices, such as mass storage systems, may be connected to the network as sources and/or destinations of messages in a manner similar to that described above in connection with the computers 12(m).

In addition, although the system 10 has been described as generally making use of a single priority among virtual circuits in the transfer of messages thereover, it will be appreciated that the system 10 can accommodate various priority levels. Thus, for example, instead of using a round-robin methodology in which each virtual circuit for which a task is to be performed be identified before one virtual circuit is subsequently identified, some virtual circuits may be identified more often than others thereby providing them (that is, the ones identified more often) with higher priority. Indeed, multiple priority levels can be provided by identifying virtual circuits a correspondingly increased number of times.

Furthermore, although the system 10 has been described as including new virtual circuit and link flow control methodologies, on the one hand, and new scheduling methodologies, it will be appreciated that systems in connection with the invention may include any of the methodologies and obtain at least some advantages of described herein.

The system 10 has been described as making use of round-robin scheduling methodologies in which the respective receive and transmit schedulers 43 and 53 identify virtual circuits for which tasks are to be performed in a round-robin manner, in virtual circuit identifier order, it will be appreciated that other forms of round-robin identification may be used. For example, various virtual circuit identifier lists may be used for the respective tasks, and when a task is enabled for a particular virtual circuit, the identification of the virtual circuit can be appended at the end of the list. In that case, the respective scheduler can identify virtual circuits from successive entries at the head of the list. It will be appreciated that the round-robin methodology used in connection with schedulers 43 and 53 can provide for a simpler hardware design, but can result in a virtual circuit being identifying for task processing only shortly after its bit has been set in the respective memory, which can, in turn, derogate to some extent from fairness as among the virtual circuits. On the other hand, virtual circuit identifier lists can increase the likelihood that tasks are performed in connection with virtual circuits in the order in which they are enabled, which can result in increased fairness as among the virtual circuits, but with somewhat more complex hardware design.

In addition, although the invention has been described in connection with the transfer of data using ATM cells, it will be appreciated that other data transfer methodologies may be used.

It will be appreciated that a system in accordance with the invention can be constructed in whole or in part from special purpose hardware or a general purpose computer, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A device configured to receive cells over a virtual circuit through a network, the device comprising:
   a buffer configured to buffer cells received by the device over the virtual circuit; and a flow control circuit having:
   a non-flow controlled state when a data occupancy level of the buffer is below a first threshold value;

a first congestion state when the data occupancy level of the buffer is above the first threshold value and below a second threshold value; and a second congestion state when the data occupancy level of the buffer is above the second threshold value, wherein if the flow control circuit is in the non-flow controlled state, the flow control circuit is configured to change states of a plurality of virtual circuits from set virtual circuit flow control states to clear virtual flow control states on a round robin basis.

2. A switching node coupled to at least a first communication link and a second communication link, the switching node comprising:

a buffer store configured to store data received from the first communication link; and an input port control configured to enter a set virtual circuit flow control state if data stored in the buffer store for a virtual circuit exceeds a first threshold level, wherein the input port control is configured to enter the set virtual circuit flow control state based on (a) an output port virtual circuit utilization number, (b) a cell occupancy level of the buffer store, and (c) a number of cells of the virtual circuit that are stored in the buffer store.

3. A method comprising:

initializing a virtual circuit identifier;

determining whether one or more virtual circuits are operating in a set virtual circuit flow control state;

if there is at least one virtual circuit operating in a set virtual circuit flow control state, determining whether a device is operating in a congestion state;

if the device is not operating in a congestion state, using the virtual circuit identifier to identify a virtual circuit in the set virtual circuit flow control state; and changing set virtual circuit flow control state of the virtual circuit to a clear virtual circuit flow control state.

4. The method of claim 3, further comprising changing the states of a plurality of virtual circuits to a clear virtual circuit flow control state on a round robin basis with the virtual circuit identifier.

5. The method of claim 3, further comprising determining whether the device is operating in a non-flow-controlled state or a normal congestion state.

6. The method of claim 3, further comprising determining whether a virtual circuit has a per-virtual circuit receive buffer occupancy level below a pre-determined threshold level.

7. The method of claim 3, further comprising transmitting a clear virtual circuit flow control message for a virtual circuit pointed to by the virtual circuit pointer.

8. A system comprising at least three devices interconnected by a network including at least one communication link, each device including a network interface for transferring messages over the network, at least one of the devices as a source device, transmitting messages over at least one virtual circuit established over the network, at least one other of said devices, as a destination device, receiving the messages over the at least one virtual circuit, and at least one of the devices as a switching node forwarding messages between the source device and the destination device, the network interface of said destination device including a receive section including a buffer configured to buffer messages received over the at least one virtual circuit and a destination flow control circuit being configured to (i) generate a set virtual circuit flow control message associated with said virtual circuit for transfer over the communication link to the source device when the portion of said buffer occupied by messages received over said at least one virtual circuit exceeds a selected virtual circuit flow control threshold level, and (ii) generate a set link flow control message for transmission over said communication link when the portion of said buffer occupied by messages exceeds a selected link flow control threshold level;

the network interface of said source device including a transmit section configured to transmit messages over said at least one virtual circuit, and a source flow control circuit configured to (i) in response to receipt by said source device of a set virtual circuit flow control message associated with said at least one virtual circuit, disable the transmit section from transmitting messages over said at least one virtual circuit, and (ii) in response to receipt by the source device of a set link flow control message over the communication link connected thereto, disable the transmit section from transmitting messages over the communication link; and said switching node forming part of the path for the at least one virtual circuit between the source device and the destination device, said switching node being configured to operate in one of at least two possible states and change the state it operates in according to a link congestion metric the states comprising:

(i) a non-flow control state, in which the switching node does not generate any set virtual circuit flow control messages, (ii) a normal congestion state, in which the switching node generates a set virtual circuit and a clear virtual circuit flow control messages the messages being generated as necessary according to a virtual circuit congestion metric.

9. A system as defined in claim 8, wherein the destination flow control circuit is further configured to generate the set virtual circuit flow control message in further response to the size of a portion of said buffer occupied by messages received over all virtual circuits.

10. A system as defined in claim 9 in which the destination flow control circuit is further configured to generate a clear virtual circuit flow control message associated with said at least one virtual circuit, the source flow control circuit being further configured to enable the transmit section to thereafter transmit messages over said at least one virtual circuit.

11. The system of claim 8, wherein the at least two possible states further include a medium congestion state, in which the switching node transmits a set virtual circuit flow control message for every virtual circuit form the at least one virtual circuits through which a message is send to the switching node, and the switching node does not transmit any clear virtual circuit flow control messages.

12. The system of claim 8, wherein the at least two possible states further include a high congestionstate wherein the switching node transmits a set link flow control message.

13. The system of claim 8, wherein the switching node includes a switch buffer for storing messages from the at least one virtual circuits in order to facilitate the forwarding of the messages over the virtual circuits, and wherein the congestion metric is derived from the total occupancy level of the switch buffer.

14. The system of claim 13 in which the switching node is further configured to, if the occupancy of the switch buffer exceeds a selected link threshold level, generate and transmit link flow control messages over each communication link connected thereto over which it receives messages.

15. The system of claim 13, wherein the virtual circuit congestion metric is derived form the occupancy of the switch buffer that is related to a specific virtual circuit.

16. A network interface for use in a destination device configured to receive messages over a communication link, each message being associated with a virtual circuit from at least one virtual circuit connected to the network interface, the network interface comprising:
- a buffer configured to buffer messages received over the at least one virtual circuit; and destination flow control circuit being configured to:
  - (i) generate a set virtual circuit flow control message associated with said virtual circuit for transfer over the communication link to the source device when the portion of said buffer occupied by messages received over said virtual circuit exceeds a selected virtual circuit flow control threshold level and the portion of said buffer occupied by all stored messages exceeds a selected non-flow control level,
  - (ii) generate a set link flow control message for transmission over said communication link when the portion of said buffer occupied by all stored messages exceeds a selected link flow control threshold level, and
  - (iii) do not generate any flow control messages when the portion of said buffer occupied by all stored messages is below a selected non-flow control level.

* * * * *